(12) United States Patent
McElwain

(10) Patent No.: US 7,218,665 B2
(45) Date of Patent: May 15, 2007

(54) DEFERRED DECORRELATING DECISION-FEEDBACK DETECTOR FOR SUPERSATURATED COMMUNICATIONS

(75) Inventor: Thomas P McElwain, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 760 days.

(21) Appl. No.: 10/423,655

(22) Filed: Apr. 25, 2003

(65) Prior Publication Data

US 2004/0213360 A1   Oct. 28, 2004

(51) Int. Cl.
*H04B 1/00* (2006.01)
*H03D 1/00* (2006.01)
*H04L 27/06* (2006.01)

(52) U.S. Cl. .................. 375/143; 375/152; 375/340

(58) Field of Classification Search ........ 375/141–143, 375/150, 152, 340, 346, 349, 350, 260, 316; 370/320, 445; 455/67.13
See application file for complete search history.

(56) References Cited

U.S. PATENT DOCUMENTS

| | | | | |
|---|---|---|---|---|
| 4,821,290 | A | * | 4/1989 | Hingorani et al. .......... 375/242 |
| 5,506,861 | A | | 4/1996 | Bottomley |
| 5,921,937 | A | * | 7/1999 | Davis et al. ................. 600/508 |
| 5,966,262 | A | * | 10/1999 | Brickner et al. .............. 360/65 |
| 5,999,899 | A | * | 12/1999 | Robinson .................... 704/222 |
| 6,011,812 | A | | 1/2000 | Laakso et al. |
| 6,122,269 | A | | 9/2000 | Wales |
| 6,282,300 | B1 | * | 8/2001 | Bloom et al. ................ 382/100 |
| 6,307,892 | B1 | * | 10/2001 | Jones et al. .................. 375/296 |
| 6,448,923 | B1 | * | 9/2002 | Zrnic et al. ............... 342/26 R |
| 6,535,554 | B1 | * | 3/2003 | Webster et al. .............. 375/233 |
| 6,839,573 | B1 | * | 1/2005 | Youssefmir et al. ...... 455/562.1 |
| 6,862,326 | B1 | * | 3/2005 | Eran et al. .................... 375/343 |
| 7,031,284 | B2 | * | 4/2006 | Supplee et al. .............. 370/335 |
| 2002/0013164 | A1 | * | 1/2002 | Leifer et al. ................. 455/562 |
| 2002/0037061 | A1 | * | 3/2002 | Learned ....................... 375/346 |
| 2002/0110206 | A1 | * | 8/2002 | Becker et al. ............... 375/346 |
| 2002/0114410 | A1 | * | 8/2002 | Brunel ......................... 375/340 |
| 2003/0108192 | A1 | * | 6/2003 | Tanrikulu et al. ....... 379/406.08 |
| 2003/0152175 | A1 | * | 8/2003 | Kuki et al. .................. 375/350 |

(Continued)

OTHER PUBLICATIONS

Poor "Turbo Multiuser Detection: An Overview" 2000 IEEE Sixth International Symposium on Spread Spectrum Techniques and Applications, vol. 2, Sep. 6-8, 2000, pp. 583-587.*

(Continued)

*Primary Examiner*—David C. Payne
*Assistant Examiner*—Aslan Ettehadieh
(74) *Attorney, Agent, or Firm*—Maine & Asmus

(57) ABSTRACT

The present invention provides an efficient means of estimating symbols transmitted in a multi-user environment in overloaded or super-saturated conditions by employing a deferred decorrelating decision feedback detector. In one embodiment, the present invention comprises a parameter estimation unit, filter bank, overloaded whitener and decision tree-based hypothesis testing. Parameter estimation defines the matched filter bank, whitening filters, and the terms of the hypothesis testing module. The whitening filter partially decouples co-channel interference and partially whitens the noise. The decision tree approach defers decisions until more evidence is accumulated and is a generalization that encompasses the jointly optimal maximum likelihood detector as well as the simpler decision feedback detectors.

20 Claims, 6 Drawing Sheets

U.S. PATENT DOCUMENTS

2003/0161416 A1* 8/2003 Meyer et al. ............... 375/343
2004/0013205 A1* 1/2004 Brunel ....................... 375/264
2004/0022335 A1* 2/2004 Arslan et al. ............... 375/346

OTHER PUBLICATIONS

Wang et al. "A Soft_Input Soft_output Decorrlating Block Decision-Feedback Multiuser Detector for Turbo-Coded DS-CDMA Systems" Wireless personal Communications, Kluwer Academic Publishers, NL, vol. 17, No. 1, Apr. 2001, pp. 85-101.*

Wang, Xiaodong et al, Turbo Multiuser Detection For Turbo-Coded CDMA, IEEE, 1999, pp. 1456-1460.

Rader, Charles M et al, Hyperbolic Householder Transformations, IEEE Transactions on Acoustics, Speech, and Signal Processing, Dec. 1986, pp. 1589-1602, vol. ASSP-34, No. 6.

Alexander, Paul D et al, On the Windowed Cholesky Factorization of the Time-Varying Asynchronous CDMA Channel, IEEE Transactions on Communications, Jun. 1998, pp. 735-737, vol. 46, No. 6.

Simmons, Stanley J., Breadth-First Trellis Decoding with Adaptive Effort, IEEE Transactions on Communications, Jan. 1990, pp. 3-12, vol. 38, No. 1.

Anderson, John B. et al, Sequential Coding Algorithms: A Survey and Cost Analysis, IEEE Transactions on Communications, Feb. 1984, pp. 169-176, vol. COM-32, No. 2.

Duel-Hallen, Alexandra, Performance of Multiuser Zero-Forcing and MMSE Decision-Feedback Detectors for CDMA Channels, IEEE, 1993, pp. 82-86.

Duel-Hallen, Alexandra, Decorrelating Decision-Feedback Multiuser Detector for Synchronous Code-Division Multiple-Access Channel, IEEE Transactions on Communications, Feb. 1993, pp. 285-290, vol. 41, No. 2.

Wei, Lei, Synchronous DS-SSMA System with Improved Decorrelating Decision-Feedbakc Multiuser Detection, IEEE Transactions on Vehicular Technology, Aug. 1994, pp. 767-772, Vo.43, No. 3.

Verdu, Sergio, minimum Probability of Error for Asynchronous Gaussian Multiple-Access Channels, IEEE Transactions on Information Theory, Jan. 1986, pp. 85-96, vol. IT-32, No. 1.

Lupas, Ruxandra et al, Linear Multiuser Detectors for Synchronous Code-Division Multiple-Access Channels, IEEE Transactions on Information Theory, Jan. 1989, pp. 123-136, vol. 35, No. 1.

Lupas, Ruxandra et al, Near-Far Resistance of Multiuser Detectors in Asynchronous Channels, IEEE Transactions on Communications, Apr. 1990, pp. 496-508, vol. 38, No. 4.

Varanasi, Mahesh K et al, Near-Optimum Detection In Synchronous Code-Division Multiple-Access Systems, IEEE Transactions on Communications, May 1991, pp. 725-736, Vo. 39, No. 5.

Alexander, Paul D et al, Iterative Multiuser Interface Reduction: Turbo CDMA, IEEE Transactions on Communications, Jul. 1999, pp. 1008-1014, vol. 47, No. 7.

Poor, H. Vincent, Turbo Multiuser Detection: An Overview, IEEE 6th Int. Symp. On Spread-Spectrum Tech, & Appli., Sep. 6-8, 2000, pp. 583-587, NJIT, New Jersey.

Robertson, Patrick et al, A Comparison of Optimal and Sub-optimal MAP Decoding Algorithms Operating in the Log Domain, IEEE, 1995, pp. 1009-1013.

Hagenauer, Joachim et al, A Viterbi Algorithm with Soft-Decision Outputs and its Applications, IEE, 1989, pp. 1680-1686.

Pottie, Gregory J et al, A Comparison of Reduced Complexity Decoding Algorithms for Trellis Codes, IEEE Journal on Selected Areas in Communications, Dec. 1989, pp. 1369-1380, vol. 7, No. 9.

Berrou, Claude et al, Near Shannon Limit Error-Correcting Coding and Decoding; Turbo-Codes (1), IEEE, 1993, pp. 1064-1070.

Berrou, Claude et al, Near Optimun Error Correcting Coding and Decoding: Turbo-Codes, IEEE Transactions on Communications, Oct. 1996, pp. 1261-1271, vol. 44, No. 10.

Wang, Duanyi et al, Low-Complexity MAP Decoding for Turbo Codes, IEEE, 2000, pp. 1035-1039.

Wang, Xiadong et al, Iterative (Turbo) Soft Interference Cancellation and Decoding for Coded CDMA, IEEE Transactions on Communications, Jul. 1999, pp. 1046-1061, vol. 47, No. 7.

Wei, Lei et al, Near Optimum Tree-Search Detection Schemes for Bit-Synchronous Multiuser CDMA Systems over Gaussian and Two-Path Rayleigh-Fading Channels, IEEE Transactions on Communications, Jun. 1997, pp. 691-700, vol. 45, No. 6.

Schlegel, Christian B et al, Performance/Complexity Issues in Multi-User CDMA Systems, IEEE, 1995, pp. 494-498.

Reed, Mark C et al, Reduced Complexity Iterative Multi-User Detection for DS/CDMA with FEC, IEEE, 1997, pp. 10-14.

* cited by examiner

DEFERRED DECORRELATING DECISION-FEEDBACK DETECTOR FOR SUPERSATURATED COMMUNICATIONS

STATEMENT OF GOVERNMENT INTEREST

Portions of this invention were made in conjunction with Government funding and there may be certain rights to the Government for the present invention.

RELATED APPLICATIONS

This application is related to U.S. Pat. No. 7,092,452 U.S. Pat. No. 6,704,376 U.S. Pat. No. 6,947,506 U.S. Pat. No. 6,839,390 and U.S. Pat. No. 6,826,140. Each of these applications is herein incorporated in its entirety by reference for all purposes.

FIELD OF THE INVENTION

This present invention relates to digital signal processing and more particularly to an efficient scheme for estimating symbols in super-saturated communications channels.

BACKGROUND OF THE INVENTION

The telecommunications industry has been expanding at an unprecedented growth rate. In particular, the wireless sector, including 3G, IEEE 802.11, wireless local area networks and Bluetooth devices, has grown far beyond expectations and at a much higher rate than the fixed telecommunications counterpart. The ability to access data and communicate anywhere at anytime has enormous potential and commercial value.

The content of the wireless sector is also changing, with more and more data being transmitted, including Internet connectivity and live feeds. The usage involving personal digital assistants (PDA's) and even smart appliances have created new markets utilizing wireless data communications. And, this wireless phenomenon is not limited to any geographical boundaries, as the growth is occurring around the globe.

Thus, despite the advancements in wireless transmission and reception, there is a growing problem of extracting more information signals within a limited bandwidth. Emerging multiple-access receiver processing procedures allow for multiple users to access the same communications medium to transmit or receive information. In addition to the problems associated with multiple users in a given bandwidth, an additional problem is the inability to process the data in the receivers in real time. Advanced receiver techniques cover several areas, namely interference suppression (also called multi-user detection), multipath combining and space-time processing, equalization, and channel estimation. These various techniques can be mixed and matched depending upon the circumstances. Proper signal processing of transmitter and receiver yield a far greater potential than current systems.

For example, a base station that processes a number of cellular devices has to receive and transmit data within a certain frequency range. The ability to extract the correct data from a given user is a difficult task, especially when the effects of interference and multipaths are considered. The problem is further complicated when the number of users exceeds the number of dimensions, resulting in an overloaded condition.

While the discussion herein illustrates wireless communications, the multiple access topologies are equally applicable to wired cable systems and local area networks, read/write operations of a disc drive, satellite communications and any application that benefits from manipulating digital data from among many multiple users.

In the past, communication systems generally utilized Frequency Division Multiple Access (FDMA) and Time Division Multiple Access (TDMA) methods to achieve channel access. FDMA refers to a communication channel wherein a signal's transmission power is concentrated into a single radio frequency band. Interference from adjacent channels is limited by the use of band pass filters however for each channel being assigned a different frequency system capacity is limited by the available frequencies and by limitations imposed by channel reuse.

In TDMA systems, a channel consists of a time slot or frame in a periodic train of time intervals over the same frequency, with a given signal's energy confined to one of these time slots. Adjacent channel interference is limited by the use of a time gate or other synchronization element that only passes signal energy received at the proper time. The system capacity is limited by the available time slots as well as by limitations imposed by channel reuse, as each channel is assigned a different time slot.

One of the goals of FDMA and TDMA systems is to try and prevent two potentially interfering signals from occupying the same frequency at the same time. In contrast, Code Division Multiple Access (CDMA) techniques allow signals to overlap in both time and frequency. CDMA signals share the same frequency spectrum and in the frequency or time domain, the CDMA signals appear to overlap one another. The scrambled signal format of CDMA eliminates cross talk between interfering transmission and makes it more difficult to eavesdrop or monitor calls therefore providing greater security.

In a CDMA system, each signal is transmitted using spread spectrum techniques. The transmitted informational data stream is impressed upon a much higher rate data stream termed a signature sequence. The bit stream of the signature sequence data is typically binary, and can be generated using a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

In operation, a plurality of spread information signals, such as binary phase shift keying (BPSK) or quadrature phase shift keying (QPSK) modulation, modulate a radio frequency (RF) carrier and are jointly received as a composite signal at the receiver. Each of the spread signals overlaps all of the other spread signals, as well as noise-related signals, in both frequency and time. The receiver correlates the composite signal with one of the unique signature sequences, and the corresponding information signal is isolated and despread.

A signature sequence is normally used to represent one bit of information. Receiving the transmitted sequence or its complement indicates whether the information bit is a +1 or −1, sometimes denoted "0" or "1". The signature sequence usually comprises N pulses, and each pulse is called a "chip". The entire N-chip sequence, or its complement, depending on the information bit to be conveyed, is referred to as a transmitted symbol.

The receiver correlates the received signal with the complex conjugate of the known signature sequence to produce a correlation value. When a 'large' positive correlation results, a "0" is detected, and when a 'large' negative correlation results, a "1" is detected.

It should be understood that the information bits could also be coded bits, where the code is a block or convolutional code. Also, the signature sequence can be much longer than a single transmitted symbol, in which case a subsequence of the signature sequence is used to spread the information bit.

Further descriptions of CDMA communications techniques are described in U.S. Pat. No. 5,506,861. This patent describes radiotelephone communication systems, and in particular, receivers for jointly demodulating a plurality of CDMA signals with multipath time dispersion.

The prior systems do not properly account for the real world mobile communication signals that suffer from signal degradation such as interference and multipath problems. The systems of the state of the art generally tended to make assumptions that all other interferers and multipaths were additive white Gaussian noise. However, this assumption is not accurate for co-channel interference and multipaths.

Multipath dispersion occurs when a signal proceeds to the receiver along not one but many paths so that the receiver encounters echoes having different and randomly varying delays and amplitudes. Co-channel interference refers to signals received from other users either directly or reflected. The receiver receives a composite signal of multiple versions of the transmitted symbol that have propagated along different paths, called rays, having different relative time. Each distinguishable ray has a certain relative time of arrival, a certain amplitude and phase, and as a result, the correlator outputs several smaller spikes. RAKE receivers are well known and attempt to 'rake' together all the contributions to detect the transmitted symbol and recover the information bit.

Conventional RAKE receivers provide satisfactory performance under ideal conditions, however the signature sequence must be uncorrelated with time shifted versions of itself as well as various shifted versions of the signature sequences of the other CDMA signals. If one received signal corresponding to the signature sequence of interest has a non-negligible cross correlation with the received signal originating from another transmitter, then the value measured at the receiver, e.g. the correlation value for the signal of interest, is corrupted. In other words, the correlation computed at the receiver that would be used to decode a particular signal of interest is overwhelmed by an interfering signal; this is referred to as the near-far problem. The interference caused by an echo of one transmitted symbol overlapping with the next transmitted symbol must also be negligible. If this is not true, the transmitted symbols interfere with past and future transmitted symbols, commonly referred to as intersymbol interference (ISI). In actuality, performance is degraded by other signal interference and ISI.

There has been much research to address signal interference with known multipath time dispersion. This is termed joint demodulation with no multipath and is further described in S. Verdu, "Minimum Probability of Error For Asynchronous Gaussian Multiple-Access Channels," IEEE Trans. Info. Theory, Vol. IT-32, pp. 85–96, R. Lupas and S. Verdu, "Linear multiuser detectors for synchronous code-division multiple-access channels," IEEE Trans. Inform. Theory, Vol. 35, pp. 123–136, January 1989; and R. Lupas and S. Verdu, "Near-far resistance of multiuser detectors in asynchronous channels," IEEE Trans. Commun., Vol. 38, pp. 496–508, April 1990.

There are a host of approaches for jointly demodulating any set of interfering digitally modulated signals, including multiple digitally modulated signals. Maximum Likelihood Sequence Estimation determines the most likely set of transmitted information bits for a plurality of digital signals without multipath time dispersion. The maximum likelihood joint demodulator is capable, in theory, of accommodating the largest number of interfering signals, but has a prohibitive computational complexity that makes it unrealizable in practice. The decorrelation receiver is another, less computationally complex receiver processing approach that zeroes out or decorrelates the different signals so that they no longer interfere with one another. The decorrelator as well as virtually every other lower complexity joint demodulator, is not capable of operation when the number of signals is over a set threshold which falls significantly short of the theoretical maximum.

In a real world multi-user system, there are a number of independent users simultaneously transmitting signals. These transmissions have the real-time problems of multipath and co-channel interference, fading, and dispersion that affect the received signals. As described in the prior art, multiple user systems communicate on the same frequency and at the same time by utilizing parameter and channel estimates that are processed by a multi-user detector. The output of the multi-user detector is an accurate estimation as to the individual bits for an individual user.

Moreover, in an article by Paul D. Alexander, Mark C. Reed, John A. Asenstorfer and Christian B. Schlagel in IEEE Transactions on Communications, vol. 47, number 7, July 1999, entitled "Iterative Multi-User Interference Reduction: Turbo CDMA," a system is described in which multiple users can transmit coded information on the same frequency at the same time, with the multi-user detection system separating the scrambled result into interference-free voice or data streams.

Low complexity multiuser detector have been contemplated that use linear multiuser detectors to achieve optimal near-far resistance. (Near-Far Resistance of Multiuser Detectors for Coherent Multiuser Communications, R. Lupas, S. Verdu, IEEE Trans. Commun. Vol 38, no. 4, pp 495–508, April 1990). While providing certain advantages, the performance has not been demonstrably improved. Varanasi and Aazhang proposed a multistage technique as described in the article Near-Optimum Detection in Synchronous Code-Division Multiple Access Systems, IEEE Trans. Commun., vol 39, No. 5, May 1991.

Decorrelating decision feedback detectors (DDFD) have been described by A. Duel-Hallen in Decorrelating Decision-Feedback Multiuser Detector for Synchronous Code-division Multiple Access Channel, IEEE Trans. Commun., vol 41, pp 285–290, February 1993. Wei and Schlegel proposed soft-decision feedback to suppress error propagation of the DDFD in Synchronous DS-SSMA with Improved Decorrelating Decision-Feedback Multiuser Detection, IEEE Trans. Veh. Technol., vol 43, pp 767–772, August 1994

Tree-type maximum-likelihood sequence detectors were also proposed for multiuser systems as were breadth-first algorithms and sequential detection including using the M-algorithm tree-search scheme with a matched filter (MF). The prior references also reveal schemes that include a decorrelating noise whitening filter (WF). There is even reference to combining a decorrelating noise whitening MF, and the M- and T-algorithms to provide near optimum performance at a low level of complexity compared with the optimal detector.

However, one of the primary disadvantages of the prior references implementations is the inability to accommodate overloaded conditions. Decision feedback techniques are limited in that they are incapable of working in supersaturated environments. Only the MMSE-based decision feedback detector can work in a supersaturated environment, however it is too aggressive with hypothesis testing to produce accurate results.

Another common problem is that the processing procedures in the receivers are difficult to run in real time. Advanced receiver techniques cover several areas, namely interference suppression (also called multi-user detection), multipath combining and space-time processing, equalization, and channel estimation. These various techniques can be mixed and matched depending upon the circumstances. Proper signal processing of transmitter and receiver yield a far greater potential than current systems.

Multi-user detection (MUD) refers to the detection of data in non-orthogonal multiplexes. MUD processing increases the number of bits available per chip or signaling dimension for systems having interference limited systems. A MUD receiver jointly demodulates co-channel interfering digital signals.

Optimal MUD based on the maximum likelihood sequence estimator operates by comparing the received signal with the entire number of possibilities that could have resulted, one for each bit or symbol epoch. Unfortunately, this processing is a computationally complex operation and it is not possible to accomplish in a real-time environment. Thus for those multi-user detectors that examine the entire space, real-time operation is often elusive.

In general, optimal MUD units function by examining a number of possibilities for each bit. However, for multi-user detectors that examine a larger capacity of signal, the computations are complex and time-consuming, thus making real-time operation impossible. Numerous attempts at reliable pruning of the optimal MUD decision process or the use of linear approximation to the replace the optimal MUD have still not produced a workable solution for the real world environment.

There are various multiuser detectors in the prior art, including optimal or maximum likelihood MUD, maximum likelihood sequence estimator for multiple interfering users, successive interference cancellation, TurboMUD or iterative MUD, and various linear algebra based multi-user detectors such as all of those detailed in the well-known text "Multiuser Detection" by Sergio Verdu. In basic terms, turbodecoding refers to breaking a large processing process into smaller pieces and performing iterative processing on the smaller pieces until the larger processing is completed. This basic principle was applied to the MUD.

There are several suboptimal multiuser detectors that are less computationally complex and known in the art. One example of suboptimal detectors, called linear detectors, includes decorrelators, minimum mean square error or MMSE detectors, and zero-forcing block linear equalizers. But, linear algebra based MUD (non-iterative) and successive interference cancellation fails for cases of overloaded multiple access systems. One example of overloading is where the number of simultaneous users is doubled relative to existing state of the art. Even for underloaded multiple access systems, the performance of non-iterative MUD and successive interference cancellation degrades significantly as the number of users increases, while the computation complexity of the optimal MUD increases significantly as the number of users increases. The computing problems are so extreme that it requires extensive and expensive hardware as well as complex processing. Moreover, an unreasonable delay would be required to decode each bit or symbol rendering such a system useless in practice.

Reduced complexity approaches based on tree-pruning help to some extent to eliminate the proper bit combination from consideration (i.e. prune the proper path in the decision tree) based on information from an unreliable bit estimate.

The M-algorithm is a pruning process that limits the number of hypotheses extended to each stage to a fixed tree width and prunes based on ranking metrics for all hypotheses and retaining only the M most likely hypotheses. The T-algorithm prunes hypotheses by comparing the metrics representing all active hypotheses to a threshold based on the metric corresponding to the most-likely candidate. Performance of M-algorithm based MUD degrades as the parameter M is decreased, but M governs the number of computations required. Similar effects are seen for other tree-pruning based MUD (T-algorithm, etc). To combat improper pruning, basic tree-pruning must ensure that M is "large enough", and therefore still encounters increased complexity for acceptable performance levels when the number of interfering signals and/or ISI lengths are moderate to large.

As an illustration of the M-algorithm as a tree-pruning algorithm, consider a tree made up of nodes and branches. Each branch has a weight or metric, and a complete path is sequences of nodes connected by branches between the root of the tree and its branches. When applied as a short cut to the optimal MUD, each branch weight is a function of the signature signal of a certain transmitter, the possible bit or symbol value associated with that transmitter at that point in time, and the actual received signal which includes all the signals from all the interfering transmissions. The weight of each path is the sum of the branch metrics in a complete path. The goal of a tree searching algorithm is to try to find the complete path through a tree with the lowest metric. With the present invention the metrics of multiple complete paths are not calculated. Rather, the metrics of individual branches in a tree are calculated in the process of locating one complete path through the tree and thereby defines one unknown characteristic of each of the co-channel, interfering signals needed to decode the signals.

A MUD algorithm within the TurboMUD system determines discrete estimates of the transmitted channel symbols, with the estimates then provided to a bank of single-user decoders (one decoder for each user) to recover the input bit streams of all transmitted signals.

Two general types of multi-user detectors within the TurboMUD system are possible, namely those that provide hard outputs, which are discrete values, and those that provide soft outputs, which indicate both the discrete estimate and the probability that the estimate is correct.

However, single-user decoders operating on hard values, or discrete integers, have unacceptable error rates when there is a large amount of interference. The reason is that discrete integers do not provide adequate confidence values on which the single-user decoder can operate. These decoders operate better on so-called soft inputs in which confidence values can range from −1 to 1, such as for instance 0.75 as opposed to being either −1 or +1.

To provide soft values that can then be utilized by a single-user decoder, the multi-user detector can generate these soft values. However the processing takes an inordinate amount of time. Since single-user decoders operate best on soft values, it is often times the case that the computational complexity for a robust MUD capable of generating these soft values makes it impossible to get a real-time result.

In an attempt to provide real-time performance by reducing the computational complexity of an iterative multi-user detector that can produce soft values, the prior references suggests algorithms for examining less than the total number of possibilities for each of the bits of data that are coming in from the multiple users. The "shortcuts" taken by this reduced complexity approach cause errors and combating these errors by increasing the number of iterations of the system completely nullifies any advantage.

Thus, while the MUD unit can generate soft values within the iterative cycle of the TurboMUD, the entire detection system is slowed down in generating these soft values. It should be appreciated that these soft values, rather than being integers which would be considered to be hard values, are real numbers, which in effect, permit a single user decoder to better error correct the output of the multi-user detector and thereby provide a more robust bit stream that will faithfully represent the original input for a given user.

In general therefore, the optimum maximum likelihood multiuser detector (Verdu, Multiuser Detection, Cambridge University Press, 1998) or an M algorithm (as described, for instance, in Schlegel, Trellis Coding, IEEE Press, 1997) with a moderate to high value of M causes the Turbo MUD to require too many computations to keep up with real time transmissions. Using a fast inferior multiuser detection scheme such as a linear-based detector or those detailed in the text "Multiuser Detection" by Sergio Verdu causes poor quality output when there are many interferers or users.

Moreover, when dealing with hand-held communications units such as wireless handsets, the amount of processing within the device is limited, directly limiting the amount of computational complexity that is allowed. In order to provide real-time performance both at a cell site and the handset, it therefore becomes important to be able to reduce the amount of computational complexity and processing time so as to achieve real-time performance.

A further description of a TurboMUD system is described in an article by Paul D. Alexander, Mark C. Reed, John A. Asenstorfer and Christian B. Schlagel in IEEE Transactions on Communications, vol. 47, number 7, July 1999, entitled "Iterative Multi-User Interference Reduction: Turbo CDMA", wherein multiple users transmit coded information on the same frequency at the same time.

The growing demand for radio communications raises the need to optimize the performance while maximizing the capacity of wireless communications systems. To optimize performance in a multi-user environment either interference must be eliminated (convention), or the number of interfering signals must be kept below a pre-determined number (virtually all non-optimum MUD techniques) which is typically far less than multiuser theory would allow. Existing approaches fail to address all of these problems. What is needed is an efficient signal processing technique to improve the quality and spectral efficiency of wireless communications and better techniques for sharing the limited bandwidth among different high capacity users. What is needed is an efficient signal processing technique to process communications channels in over-loaded conditions. Such a suboptimal system should efficiently estimate symbols and allow for real-time processing that does not exploit error correction codes. For commercial appeal, the invention should operate with existing transmitters and merely upgrade the receiver processing. Finally, the present system should allow more active transmissions in a given bandwidth without compromising performance. As can be seen, attempts to make real-time processing multi-user processing have been frustrated by complex and sophisticated hardware and processing requirements. What is needed therefore is a method and apparatus for allowing multiple users to operate in the same channel. Such a system should provide accurate cancellation of interfering signals while reducing complex processing.

BRIEF SUMMARY OF THE INVENTION

The invention is devised in the light of the problems of the prior references described herein, and a general object of the present invention is to provide a novel and useful apparatus and technique that solves the problems described herein.

One object of this invention is to allow overloaded processing of more users than available dimensions using a whitening front end unit to pass the proper parameters. A practical implementation of the super-saturated or overloaded processing has eluded the communications industry, however utilizing a pseudo-whitened front end improvement to an M-algorithm for receiving and decoding co-channel interfering signals allows real time processing of supersaturated communications. Thus, the present invention allows for the overloading of any existing multiple access system in which "channels" consisting of time slots, frequencies, or signature sequences can be simultaneously re-assigned without suffering the crippling ramifications of interference using state of the art receivers in overloaded schemes.

It is well known to those in the art that linear based Turbo-MUD does not converge to a high quality bit stream for each interfering user when overloaded. Overloading occurs when the loading is greater than 1, or when there are more signals than currently supported by state of the art multiple access schemes. When the loading is increased to two or more, the pseudo-whitened M-algorithm processing of the present invention has been demonstrated to provide high quality bit streams for each interfering user.

For illustrative purposes, one overloaded application demonstrating supersaturated conditions is for surveillance situations of cell phones where there will likely be many more users being received, and the processing of the present invention extracts the desired user's signal from among many other users and noise and interference.

This invention allows many more simultaneous users than previously thought possible. A further object of the invention is that it is of sufficiently low-complexity such that the system can be implemented in real time. This means service providers can allow more active transmitters, improved performance and low complexity (e.g. paying customers, users, phones, devices, etc.) without adding more bandwidth or compromising performance. In addition, the present system replaces existing receivers without any modification to the transmitters, thereby allowing service providers to offer improved performance without changing the signaling method. Furthermore, the present invention is well suited for fixed point processing architectures. For example, cellular phones can still operate with the additional features added to the base station or tower.

Therefore, the present invention is a major improvement to the communications systems involving interference. The result of allowing interference when using state of the art receivers is a set of decoded bit streams, one for each transmitting user. The resulting bit streams are generally so full of errors that they are rendered completely useless for the majority of users of the system. Thus, re-assigning channels in state of the art systems results in partial or complete failure of the communication system.

The present invention solves the aforementioned problems by employing the unique combination of elements, comprising the parameter estimation unit, matched filter bank, whitening filter bank, and decision tree-based hypothesis testing. Parameter estimation is used to define the matched filter bank, whitening filters, and the terms of the hypothesis testing module. The whitening filter partially decouples the co-channel interference and partially whitens the noise and is defined in a manner that operates in a supersaturated communications environment. The decision tree approach defers decisions until more evidence is accumulated and is a generalization that encompasses the jointly optimal maximum likelihood detector as well as the simpler decision feedback detectors. The structure of the decision tree is determined by the whitening filter bank. The invention described herein is well suited for implementation in an iterative decoding solution that exploits error correction codes. In addition, the approached defined herein is suitable for symbol asynchronous as well as symbol synchronous. Also, this algorithm is suitable for a variety of signaling schemes such as M-ary Phase Shift Keying (MPSK).

The present invention was realized with the recognition that the Improved Decorrelating Decision Feedback Detector (IDDFD) was very efficient for solving undersaturated communications problems but unable to solve the super-saturated communications problem. In addition, the IDDFD is limited to symbol synchronous implementations. Thus, an object of the present invention is a communications medium with an efficient means of estimating symbols transmitted in a super-saturated communications channel for both land-line and wireless applications.

The Decorrelating Decision Feedback detectors of Duel-Hallen, described in "Decorrelating Decision-Feedback Multiuser Detector for Synchronous Code-Division Multi-Access Channels" IEEE Trans. Commun. Vol 41, PP 285–290, February 1993, does not satisfy the demands of current systems. The industry requires a system that is capable of operating in undersaturated or supersaturated environments, which is not possible with Duel-Hallen. Another difference is that the present invention defers decision until more evidence is accumulated while the Duel-Hallen process does not accumulate data. In addition, while the present scheme is applicable to both synchronous and asynchronous implementation, Duel-Hallen is only described for synchronous operation. Finally, due to the structure and properties of the present invention, it provides more efficient computations and implementation strategies.

With respect to MMSE Decorrelating Decision Feedback detectors described in Duel-Hallen, "Performance of Multiuser Zero-Forcing and MMSE Decision-Feedback Detectors for CDMA Channels", Conference Record of the Second Communications Theory Mini-Conference in conjunction with Globecom '93, Houston Tex., December 1993, pp 82–86, the present invention defers decision until more evidence is accumulated, the present invention permits asynchronous implementation, and the present invention provides more efficient computations and implementation strategies.

The present invention is also a marked improvement to Improved Decorrelating Decision Feedback detectors set forth in Wei and Schlegel, "Synchronous DS-SSMA with Improved Decorrelating Decision-Feedback Multiuser Detector", IEEE Trans. Veh. Technol., pp 767–772, August 1994. The present invention is capable of operating in supersaturated environments and also works for asynchronous implementation, and it provides more efficient computations and implementation strategies.

An integrated whitening and decision-tree based hypothesis testing procedure represents one of the most efficient means for estimating symbols transmitted in a super-saturated communications channel in a manner that does not exploit any error correction codes. Therefore one of the problems solved by this invention is an efficient means of estimating symbols transmitted in a super-saturated communications channel. Unlike previously documented suboptimal solutions, this approach is not restricted to undersaturated communication environments, which are defined as the number of signals or users exceeding the number of independent dimensions.

A further object is a method that reduces the likelihood of improper pruning, thereby allowing for a reduction in the number of branches examined (and, therefore, a reduction in complexity) without negatively impacting performance. For the same complexity, the invention provides for superior performance when compared to other reduced-complexity tree-pruning-based MUD known in the art.

The present invention is an improvement on a multiuser detection processing procedure that allows for real time implementation in receivers designed for typical and high data rate multiple access communication, without causing degradation in quality of service or decreasing the total throughput. Specifically, this invention solves the problem related to the high computational complexity required by the tree-pruned iterative MUD to avoid the degraded performance caused by early incorrect pruning of the decision tree. In addition, this invention solves the problem of increased complexity typically needed to produce soft-values within the MUD.

The subject of the invention disclosed in this application does not require that the signals correspond to any particular MA scheme or even that they are all of the same type, or come from a wireless system. For example, the present invention operates in the same manner on any set of digitally modulated interfering signals to include cellular CDMA systems, TDMA systems, FDMA systems, storage medium, wired MA systems such a cable modems, wireless local area network systems, or yet undetermined systems. For example, Spatial Division Multiple Access (SDMA) is generally a satellite communications mode that optimizes the use of radio spectrum and minimizes system cost by taking advantage of the directional properties of dish antennas, and benefits from the bit processing described herein. The only requirement for viable operation of the present invention is that each signal source produces a signal with the information digitally modulated using a signature pulse or finite duration signal of some sort. While CDMA is described for illustrative purposes to explain the invention, the specific example of CDMA is merely for ease of understanding. The present invention is directed to any other form of digital communication or signal storage methods, and those skilled in the art recognize that the terminology is not tee be deemed as limiting.

A further feature of the present invention is that it works equally well using mixed rate communication systems such as IS95, wherein the user chooses the transmission rate. The parameter estimator that handles the differing transmission rates passes along the information to the present system.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The methods and embodiments of the Hybrid Turbo-MUD disclosed herein enable implementations of advanced receiver processing providing high quality real-time processing for multiple access systems, including overloaded conditions. The computational complexity that can separate co-channel interfering digitally modulated signals was heretofore an insurmountable problem. The preferred embodiment is an illustration of the digital processing technique that is applicable to many variations and applications all within the scope of the invention.

The methods and embodiments of the synchronous/asynchronous deferred decorrelating decision-feedback detector disclosed herein enable implementations of advanced receiver processing providing high quality real-time processing for multiple access systems operating in a super-saturated environment.

Figure 1:
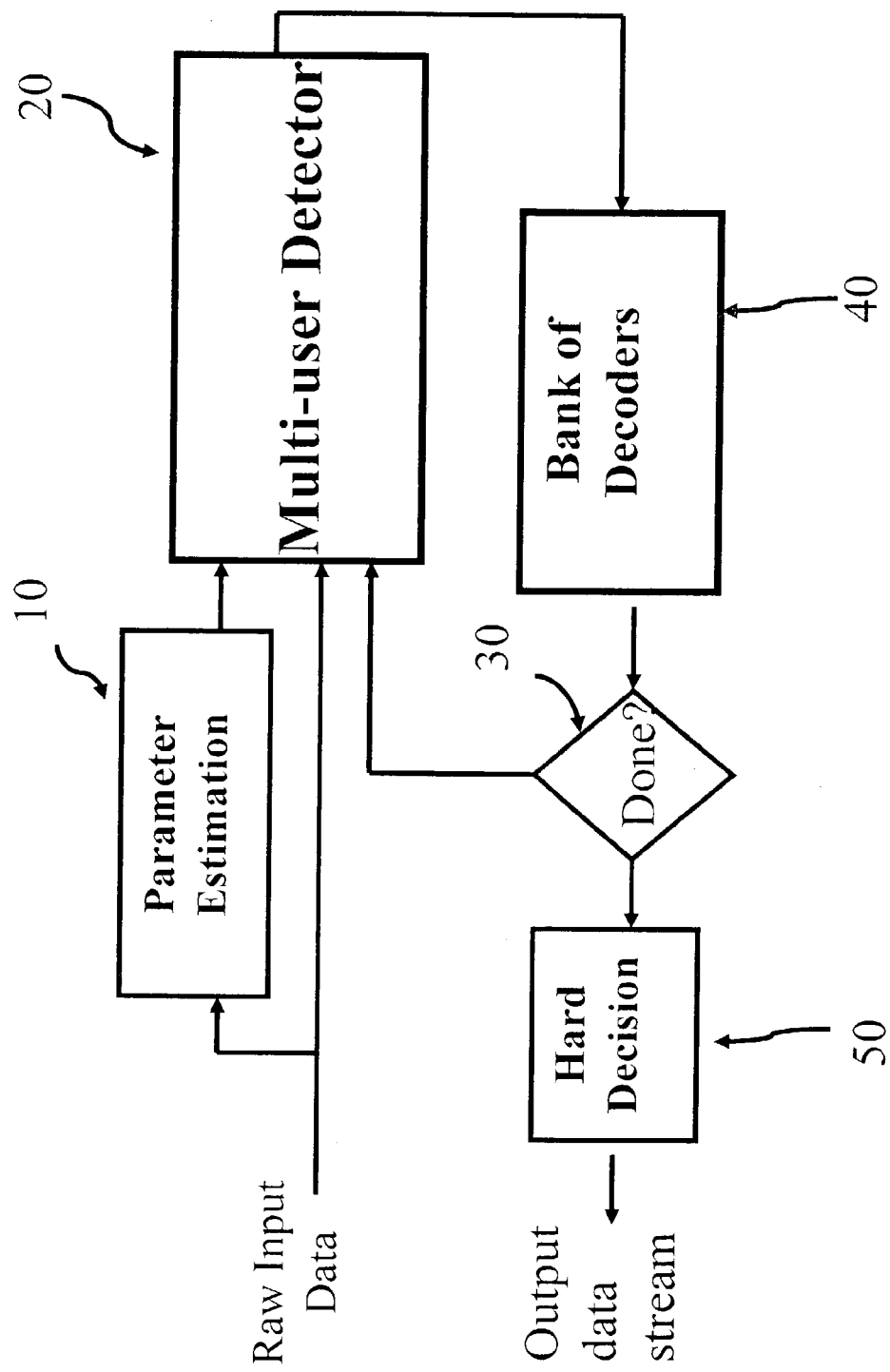
FIG. 1 shows a block diagram presentation of prior art conventional MUD system illustrating the iterative processing for conditional probabilities for each decoded symbol of each user

Referring to FIG. 1, the basic iterative Mud procedure is diagrammatically presented, and is well known from published literature such as Poor, "Turbo Multiuser Detection: An overview," IEEE $6^{th}$ Int. Symp. On Spread-Spectrum Tech. And Appli., NJIT, New Jersey, Sep. 6–8, 2000 and Alexander, Reed, Asenstorfer, and Schlegel, "Iterative Multiuser Interference Reduction: Turbo CDMA," IEEE Trans. On Comms., v41, n7, July 1999. The iterative MUD is representative of the approaches used to incorporate turbo decoding methods into joint MUD/FEC (Fourier Error Correction) decoding and to then reduce the complexity of the system.

It should be readily appreciated that there are two general embodiments applicable to the MUD of FIG. 1, namely an iterative embodiment and a non-iterative embodiment. The iterative embodiment or Turbo-MUD is described herein while the non iterative MUD merely runs a single cycle through the process.

An input signal of raw non-manipulated data at the receiver (not shown) is comprised of the aggregate of many signals from many different transmitters, where each signal is assigned a (frequency, timeslot, and/or spreading code) from a finite set of channels. In a typical scenario, the aggregate signal is collected at the receiver (not shown), down-converted and digitized. The processing of the present invention enables the re-assignment of channels by users that are within close proximity. The interference from these various users generally requires complex processing and inordinate amount of time which is solved by the present invention.

The raw input data represents data after some front end processing such as downconversion, amplification, and analog-to-digital conversion, although other forms of communication have been contemplated herein. This digital input signal or raw input data is then input to the multiuser detector (MUD) 20. The MUD processing can employ the various state of the art schemes, including M-algorithm, T-algorithm, Fano-algorithm and other tree-pruned approaches known to those in the art. MUD systems generally require some raw data parameters in order to establish accurate decision trees for processing.

A parameter estimation unit 10 processes the various parameters for the received raw data, and provides certain data to the MUD 20. The parameter estimation unit is known in the art, and a detailed description is available in published patent application U.S. 2002/0037061 A1 entitled "System for Parameter Estimation and Tracking of Interfering Digitally Modulated Signals", which is incorporated by reference.

In an optimal case, the MUD detector 20 is a full-complexity MAP detector. Suboptimal reduced complexity MAP-based approaches are also known in the relevant art. The bit streams from the MUD 20 are passed to a bank of error correction decoders unit 40. In the non-iterative MUD, the raw data is processed by an algorithm of the MUD and the error correction decoders output the data stream for each user either in soft or hard output.

The iterative MUD or TurboMUD 20 can be structured as a hard output or soft output processing, however in order to demonstrate a working embodiment, the soft output version is addressed herein, but it is well within the scope of the present invention to utilize hard outputs.

In a Turbo-MUD system, decoding and confidence information is passed between the MUD 20 and decoder components 40. Maximum a posteriori (MAP) decoders (or approximations of MAP decoders) are well known to those in the art and are used for both the MUD and single-user (SU) decoders, so that soft output information is available if desired. The MUD 20 assumes knowledge of various parameters such as relative received timing offsets, carrier phase, frequency offsets, received amplitudes, and multipath structure for each of the interfering signals present in the received signal.

The multiuser detection unit 20 outputs a bit (or symbol) stream associated with each interfering signals present on the channel for one data block. Deinterleavers and interleavers (not shown) are optional elements coupled between the MUD 20 and the decoders 40 that are used if the transmitted signals are interleaved, such as the CDMA format. The MUD detector 20 of the prior references passes soft decisions in the form of reliability, or confidence, measures to the decoders 40. The reliability measures are presented with one associated with each symbol of each user to the bank of decoders 40. If the signals were transmitted with interleaving, the reliability measures from the MUD 20 are first passed through a deinterleaver (not shown) and passed on in shuffled form to the decoder 40. Shuffling refers to processing the same values but changes the placement or presentation of the values. If interleaving was present in the transmitter, an interleaver unit performs interleaving. The time-shuffled conditional probabilities are input back to the MUD section 20. When the transmitter employs interleaving it changes the presentation of the values but not the values themselves. IS-95 is the standard for CDMA and is an example of interleaved signals.

In one known variation, there is a bank of error correction decoders 40 that provide soft output or restore values associated with prior probabilities. Viterbi decoders can be used, but generally outputs hard values. The single user decoders calculate conditional probabilities, one for each decoded symbol of each user, and output them as confidence values back to the MUD 20. Soft input soft output decoders, such as MAP or Soft-output Viterbi algorithm (SOVA) decoders are examples known in the art.

MAP decoding is known in the art and further described in C. Schlegel, *Trellis Coding*, IEEE Press, 1997; Robertson, Villebrun and Hoeher, "A Comparison of Optimal and Sub-Optimal MAP Decoding Algorithms Operation in the Log Domain," *ICC*95; Hagenauer, and Hoeher, "A Viterbi Algorithm with Soft-Decision Outputs and its Applications," *Globecom* 89; Pottie and Taylor, "A Comparison of Reduced complexity Decoding Algorithms for Trellis Codes," *J Sel. Areas in Comm* December 1989. The iterative turbo principle, on which Turbo MUD is based, is described by Berrou, Glavieux, and Thitimajshima, "Near Shannon Limit Error-Correcting Coding and Decoding: Turbo-Codes (1)," *ICC* 93; Berrou and Glavieux, "Near Optimum Error Correcting Coding and Decoding: Turbo-Codes", *Trans on Comm*, October 1996; and Wang and Kobayashi, "Low-Complexity MAP Decoding for Turbo Codes", *Vehicular Technology Conference* 2000]. Turbo MUD approaches are described in, for example, Alexander, Reed, Asenstorfer, and Schlegel, "Iterative Multiuser Interference Reduction: Turbo CDMA," *Trans on Comm*, July 1999; Poor, "Turbo Multiuser Detection: An Overview," *ISSSTA* 2000; and Wang and Poor, "Iterative (Turbo) Soft Interference Cancellation and Decoding for Coded CDMA", *Trans on Comm*, July 1999.

For TurboMUD, soft outputs for each bit of each user from the bank of decoders 40 are fed back to the MUD 20 for each iteration. The multiuser detector 20 takes these soft inputs along with the original raw input signal to calculate an improved, less corrupted bit stream for each user. This iterative process continues until the desired quality is reached or a fixed number is reached. At that point, estimates of the data sequences for all active users are output. Operation then commences for the next block of data, repeating the process described above.

The number of iterations for processing between the MUD 20 and the decoders 40 can be set to a fixed counter or by checking if there were significant changes to the data from the last iteration. Once the data is no longer being altered or reaches a certain iteration counter limit, the data from the decoder 40 can be output as final estimates of what the user sent. A fixed number of iterations can be stored and used and processed by the decision block 30. Alternatively, the information between the low complexity MUD 20 and the decoders 30 repeats in subsequent iterations until an asymptote is reached or the desired performance level is attained. A buffer can store the previous values and compare them to the latter processed values during the iterative process.

When processing is completed, or Done? 30, the soft output of the bank of error decoders 40 is passed to a hard decision unit 50 which outputs the final stream of decisions or output data stream for each interfering user for the current data block. The process is repeated for all subsequent data blocks. As described herein, this prior art TurboMUD suffers from limitations with respect to real-time processing of data in a multi-user environment due to the complexity of processing a large number of possibilities in the tree. As the output of the decoders 40 can be hard values in certain applications, it should be understood that the hard decision is optional depending upon the implementation.

Figure 2:
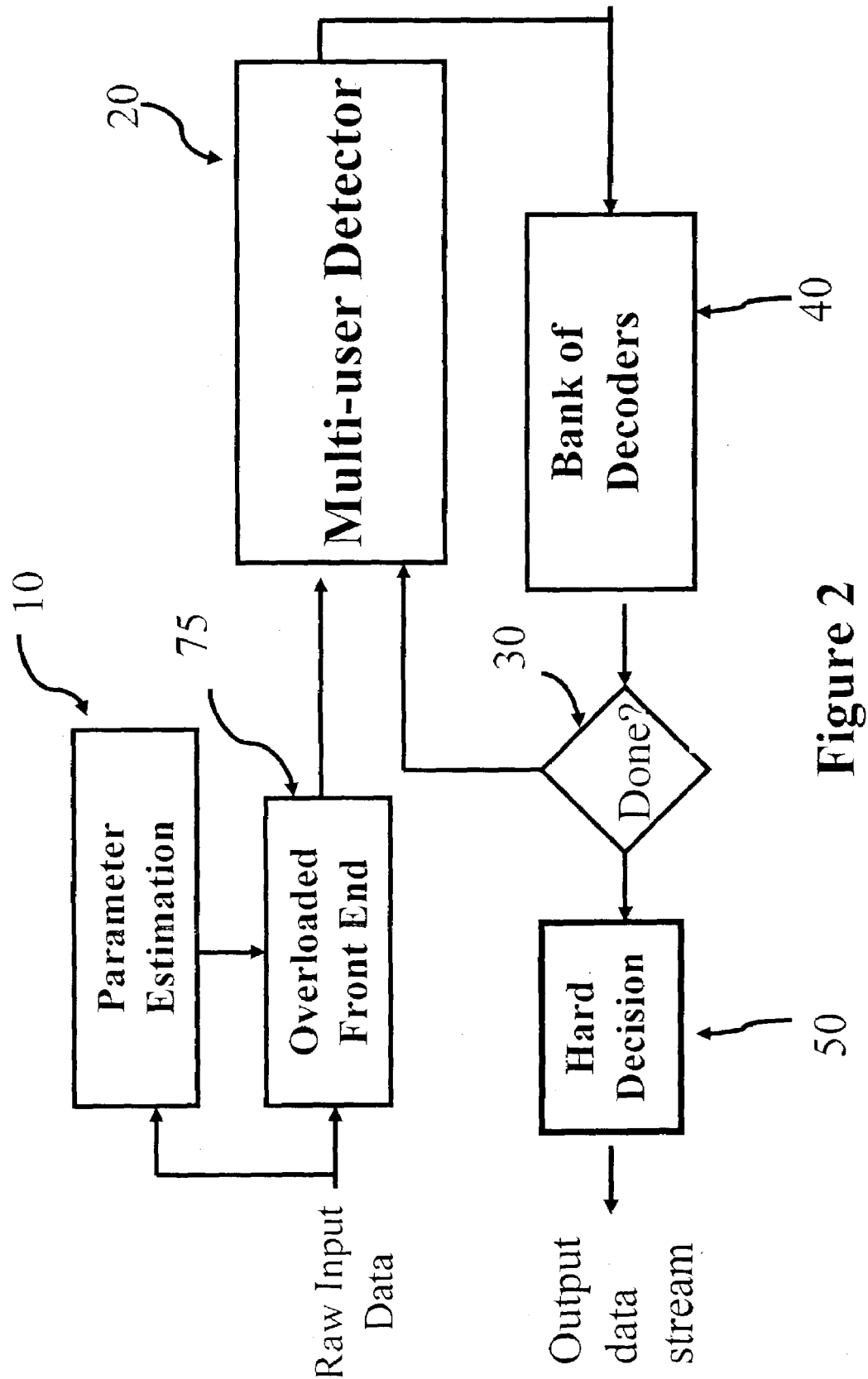
FIG. 2 illustrates one embodiment of the overloaded front-end for supersaturated communications coupled to the MUD scheme

FIG. 2 shows one embodiment the present invention that uses an overloaded front end 75 in cooperation with MUD 20. The raw input data is coupled to the parameter estimator 10 as well as the overloaded front end 75. The received measurement from the parameter estimation unit 10 is passed through a filter (shown in FIG. 3) of the overloaded front end 75, such as a whitening matched filter, whitened-M algorithm filter, or matched filter. The filtering of the overloaded front end 75 pre-processes an input signal comprised of more transmissions than orthogonal channels. The overloaded whitened front end 75 sends the filtered signal to the MUD 20 such as an M-algorithm.

The overloaded front end unit 75 incorporates a whitening filter (not shown) that partially decouples the co-channel interference and partially whitens the noise. The front end unit 75 uses a decision tree approach to defer decisions until more evidence is accumulated and is a generalization that encompasses the jointly optimal maximum likelihood detector as well as the simpler decision feedback detectors. This front end is well suited for implementation in the iterative decoding solution of the present invention that exploits error correction codes, as well as the approached defined here is suitable for symbol asynchronous as well as symbol synchronous.

Based on data from the parameters estimation unit 10, the front end 75 develops a model of received signal and computes a whitener that essentially consists of a square-root factorization of the diagonally loaded correlation matrix. Ordering techniques, such as received power, SNR based, and likelihood based, are used to form the order of the data.

The improved ordered hypothesis pruned soft data from the front end 75 goes through the typical MUD processing. The multiuser detection unit 20 outputs a bit (or symbol) stream associated with each interfering signal present on the channel for one data block. Deinterleavers and interleavers (not shown) are optional elements coupled between the MUD 20 and the decoders 40 that are used if the transmitted signals are interleaved, such as the CDMA format. The MUD detector 20 passes soft decisions in the form of improved reliability, or confidence, measures to the decoders 40. The reliability measures are presented with one associated with each symbol of each user to the bank of decoders

40. If the signals were transmitted with interleaving, the reliability measures from the MUD 20 are first passed through a deinterleaver (not shown) and passed on in shuffled form to the decoder 40.

Depending upon the number of fixed iterations or desired accuracy, the output of the decoders 40 is checked to determine if processing is completed, or Done? 30. Once the criteria are satisfied, the soft output of the bank of error decoders 40 are passed to a hard decision unit 50 which outputs the final stream of decisions or output data stream for each interfering user for the current data block. The process is repeated for all subsequent data blocks in the iterative or Turbo-MUD application.

If the criteria for Done? 30 are not satisfied, the soft outputs for each bit of each user from the bank of decoders 40 are fed back to the MUD 20 for each iteration. The multiuser detector 20 takes these soft inputs along with the data from the overloaded front end 75 to calculate an improved, less corrupted bit stream for each user.

The number of iterations for processing between the MUD 20 and the decoders 40 can be set to a fixed counter or by checking if there were significant changes to the data from the last iteration. Once the data is no longer being altered or reaches a certain iteration counter limit, the data from the decoder 40 can be output as final estimates of what the user sent. A fixed number of iterations can be stored and used and processed by the decision block 30. Alternatively, the information between the MUD 20 and the decoders 110 repeats in subsequent iterations until an asymptote is reached or the desired performance level is attained. A buffer can store the previous values and compare them to the latter processed values during the iterative process.

Figure 3:
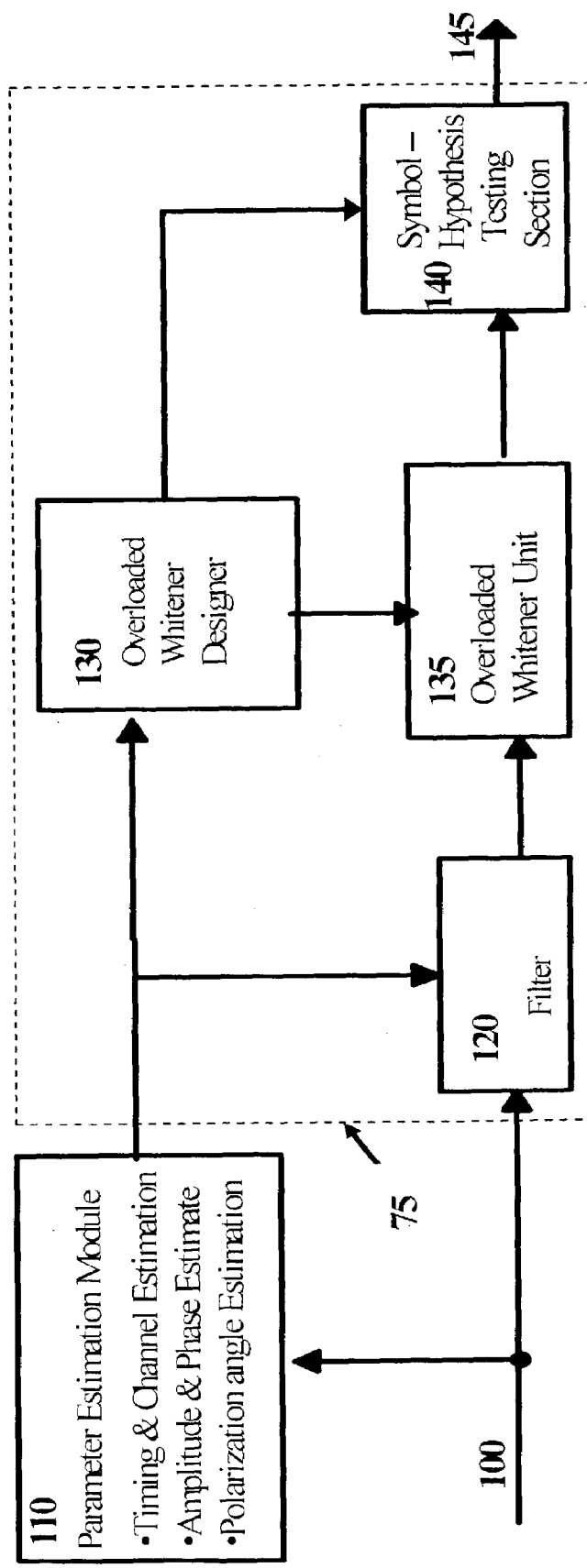
FIG. 3 illustrates one embodiment of the asynchronous deferred decorrelating decision-feedback detector for supersaturated communications

FIG. 3 is a diagram describing an embodiment of the elements of the overloaded front-end that is applicable for super-saturated communications. This approach is considered an extension of the decorrelating decision feedback detector (DDFD) and the MMSE Decision-Feedback Detectors (MDFD). These approaches are based on feed-forward and feedback filters that are designed to suppress multiuser interference provided the feedback data is correct. The decision feedback techniques order the symbol hypotheses by the power of the received signals. Decisions are made sequentially on each symbol hypothesis and each decision is fedback to subtract the corresponding interference from the received data stream.

The present approach described herein differs from previous approaches in that the decisions are deferred until more evidence is accumulated supporting each hypothesis. The result is a hypothesis pruning procedure that performs a decision tree search by limiting the number of hypotheses extended to the next stage of the decision tree, wherein the structure of the decision tree is determined by a whitening filter bank. The decision feedback techniques order the symbol hypotheses by the power of the received signals in a typical embodiment. Decisions are made sequentially on each symbol hypothesis and each decision is fedback to subtract the corresponding interference from the received data stream. Many approaches are applicable such as the M-algorithm and the T-algorithm. This approach is attractive because it is closely related to the jointly optimal maximum likelihood detector. Specifically, no pruning at all is the jointly optimal maximum likelihood detector. This new approach is somewhat similar to the Improved Decorrelating Decision-Feedback Detector (IDDFD) presented by Wei and Schlegel. However, their approach is not suitable for the case of more users that dimensions because their whitener does not exist.

The raw data 100 is coupled to the parameter estimation module 110 and to the filter 120. The received measurement from the parameter estimation unit 110 is passed through a filter 120, such as a whitening matched filter, whitened-M algorithm filter, or matched filter. The filter 120 tries to 'spread' or 'warp' the signal so that it is easier to distinguish between signals by changing the axes. Supersaturated or overloaded conditions occur when the number of users exceeds the number of dimensions. Number of dimensions is determined by the physical parameters of the system. There are other filters that handle overloaded conditions, and the present invention is easily adaptable to different filters. The filter 120 of the over-loaded front end 75 pre-processes the input signal 100 comprised of more transmissions than orthogonal channels and eventually sends the filtered signal to the MUD such as an M-algorithm.

One of the attributes of the present invention that distinguish this approach from previous solutions is the addition of the overloaded asynchronous whitener designer 130 that is applied by the overloaded asynchronous whitener unit 135. The designer 130 and the whitener 135 partially decorrelate the multi-access interference and partially whiten the noise that was colored by the application of the filter 120. The whitener designer 130 and whitener 135 are designed to account for overloaded communication schemes where the number of users exceeds the number of dimensions. In addition, the filters in 120 are designed for symbol-asynchronous reception, however the application to symbol-synchronous communication configurations is obvious to those skilled in the art. Applications to various signal schemes, such as M-ary Phase Shift Keying (MPSK), are also within the scope of the invention.

Figure 4:
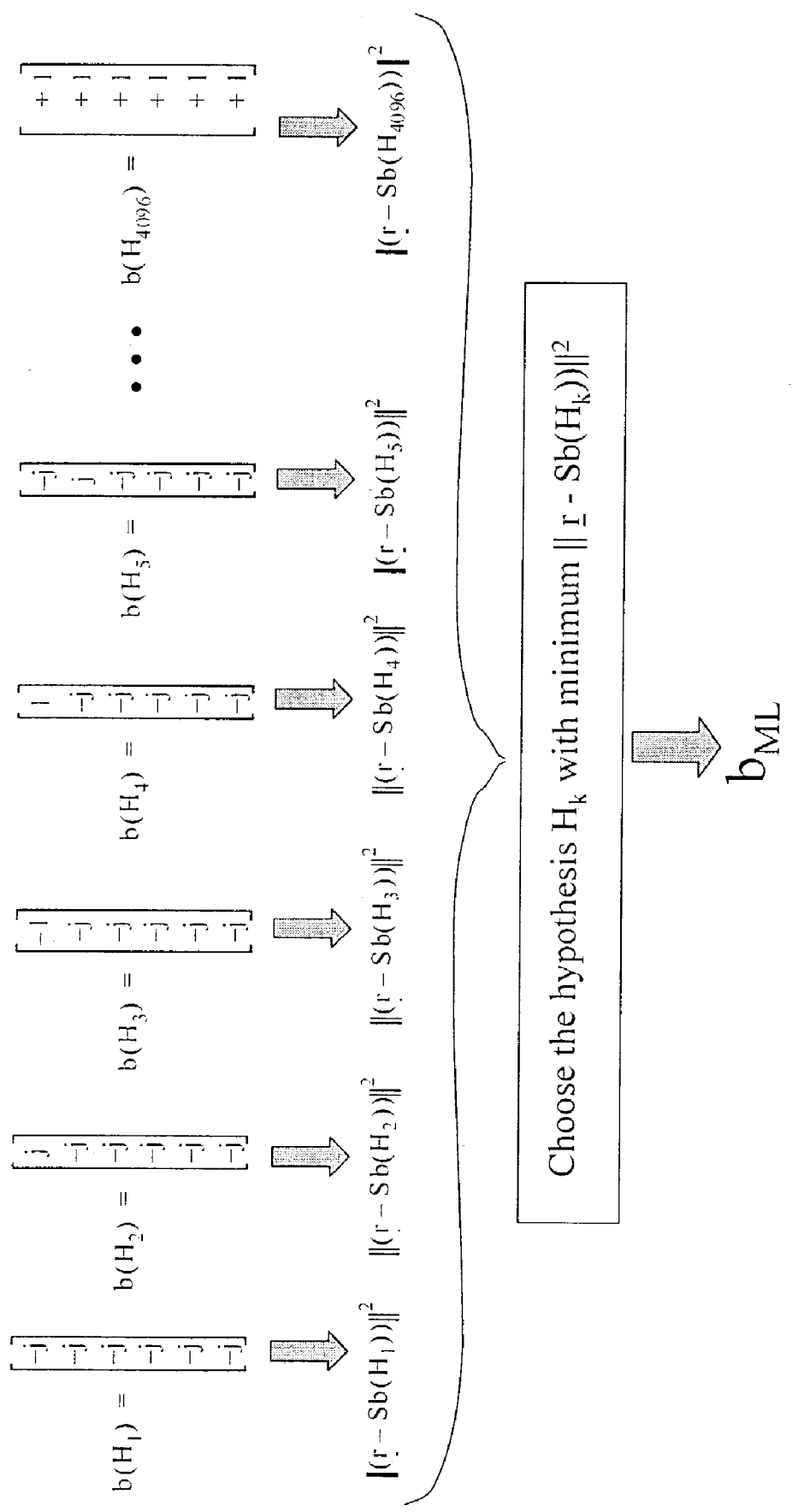
FIG. 4 illustrates an implementation of maximum likelihood joint detection for a bit synchronous QPSK problem with 6 users as a representative example

As noted herein, the optimal solution in state of the art processing is a brute force approach to the maximum likelihood estimate in which an exhaustive search is executed FIG. 4 shows the maximum likelihood solution for a bit synchronous QPSK problem with 6 users as a representative example. The received signal is effectively be modeled as the linear combination of many co-channel signals arriving asynchronously in this example, which is mathematically illustrated as:

$$r[n] = \sum_{i=1}^{F} \sum_{k=1}^{K} b_k[i] a_k s_k(nT_n - iT_i) + n_w(nT_n). \quad \text{Equation 1}$$

The term $b_k[i]$ represents the bit for user k at time i. The term $s_k(nT_n-iT_i)$ represents the user's channel characteristic for sample index n for the symbol period i for the user k. There are delays producing asynchronous reception, which are represented in the channel model $s_k(nT_n-iT_i)$. The model of the characteristic waveform, $s_k(\bullet)$, is normalized, thus the amplitude of the transmitted signal for user k is represented by $\alpha_k$. The symbol period is defined by $T_i$ and the sample period is represented by $T_n$. For clarification, the channel is modeled similar in nature to the CDMA problems in which separate channels are used for different users. However, this model is not limited to CDMA and is equally applicable to other modulations schemes such as TDMA. If the sample rate equals some multiple of the chip rate, then $T_n=T_i/(\tau N_{chip})$, where $\tau$ is the amount of oversampling, the linear model represents a summation of K separate users. The summation over F symbols in Equation 1 refers to the F symbols per frame. The user's signal characteristic, $s_k(nT_n-$ $iT_i$), combines a sequence of signal transformations including pulse shaping filter, signal delays, spreading sequence, and receiver filters.

Multiple access interference is modeled in Equation 2, and is represented concisely using matrix notation. For the case of $T_n=T_i/N_{chip}$, the received samples during a symbol period i are represented by a N-element vector, r[i], that may include inphase and quadrature (I/Q) components and multiple polarizations. The K symbols corresponding to the K simultaneous users are represented by the K-element vector, b[i].

Therefore, the linear model for each symbol period is represented by:

$$r[i]=SAb[i]+n_w[i], \quad \text{Equation 2}$$

where i 1, ..., F. The term S is a N×K matrix representing the combination of the spreading code, channel codes, pulse shaping filter, and propagation effects $$S = \begin{bmatrix} s_1[1,i] & s_2[1,i] & \cdots & s_K[1,i] \\ s_1[2,i] & s_2[2,i] & \cdots & s_K[2,i] \\ \vdots & \vdots & \ddots & \vdots \\ s_1[N,i] & s_2[N,i] & \cdots & s_K[N,i] \end{bmatrix} \quad \text{Equation 3}$$

The matrix entries, $s_k[n,i]$, represents the $n^{th}$ sample of the signal characteristic waveform for user k during symbol period i. The term A is a K×K diagonal matrix representing the complex signal amplitudes, and $n_w[i]$ is a N×1 vector representing additive noise. A typical demodulating scheme models the additive noise problem by using single user scenarios and treats other simultaneous channels as noise. These approaches lead to solutions like matched filters and RAKE receivers. Whereas, the jointly optimal maximum likelihood detector assumes the existence of all active users and simultaneously attempts to demodulate all signals to produce bits streams for all simultaneous digital transmissions. Since the bits are constrained to a finite set, the jointly optimal detector, in a maximum likelihood sense, for the bit sequence of all users can be defined as:

$$\hat{b}_{ML} = \arg \min_{b \in \{-1,+1\}^K} \|r - SAb\|^2 \quad \text{Equation 4}$$

It should be understood that the bit hypothesis is not limited to bipolar states and this is an example for illustrative purposes. This notation is based on the previous linear matrix representation for samples of received waveform based on the presence of all users. As discussed, the optimal solution is a brute force approach to the maximum likelihood estimate in which an exhaustive search is performed. The maximum likelihood solution for a bit synchronous QPSK problem with 6 users is shown in FIG. 4, where b∈{-1, +1, -j, +j}. The solution consists of exhaustively evaluating the distance between the received samples and the linear model of the samples using every possible hypothesis of the bit sequence. For the case of an inter-symbol interference represented by L periods per symbol, the number of hypotheses required in the asynchronous implementation is $4^{KL-1}$ for the QPSK problem performed at the transmitted symbol rate. Therefore lower complexity solutions are required for real-time operation.

The apparatus in FIG. 3 is now described in more detail. A data stream 100, potentially complex, is received from some a source. For the case of Code Division Multiple Access (CDMA) communications schemes, the data stream is sampled by some multiple of the chip rate. For TDMA communication schemes, the data stream is sampled at some multiple of the symbol rate.

The data 100 represents a vector of data, transferred at some rate (e.g., the symbol rate). This data 100 is transmitted to the matched filter 120. In addition, the same vector 100 is passed on to the parameter estimation module 110. The purpose of the parameter estimation module 110 is to estimate timing, signal amplitudes, phases, polarization, and identification of transmission channels. Estimates of the parameters are passed to design the matched filter bank 120 and estimates of the parameters are also passed to design the corresponding whitener 130.

Symbol hypothesis testing 140 may include the maximum likelihood detector which is expressed mathematically as Equation 4, which is based on the linear model for the received samples illustrated by:

$$r=SAb+n_w, \quad \text{Equation 5}$$

This defines the received samples in terms of the transmitted bits, b, and a model of the channel defined in S. The maximum likelihood detector is a brute force approach which requires an exhaustive search as illustrated herein, and provides an example of the maximum likelihood solution for a bit synchronous QPSK problem with 6 users, where b∈{-1,+1,-j,+j}. The solution consists of exhaustively evaluating the Euclidean distance between the received samples and the linear model of the samples using every possible hypothesis of the bit sequence. For the case of an inter-symbol interference represented by L periods per symbol and for K users, the number of hypotheses required in the bit-asynchronous implementation is $4^{KL-1}$ for the QPSK problem performed at the transmitted symbol rate.

The maximum likelihood solution in Equation 4 is too computationally intensive for problems with a large number of users or severe intersymbol interference from multipath. The approach considered herein consists of a simplified version of the maximum likelihood detector that nearly achieves the same performance in a supersaturated environment with large savings in the number of computations.

The maximum likelihood solution is rewritten as $$\hat{b}_{ML} = \arg \min_b \{(r - SAb)^H \Sigma^{-1} (r - SAb)\} \quad \text{Equation 6}$$

Where Σ represents the covariance of the noise, $n_w$. When the noise is white, the weighted least squares solution in Equation 6 is identical to the maximum likelihood detector in Equation 4. For any matrix W the weighted least squares solution in Equation 5 is identical to the following solution $$\hat{b}_{ML} = \arg \min_b \{(w - WSAb)^H \Sigma_W^{-1} (w - WSAb)\} \quad \text{Equation 7}$$

Where w=Wr and $\Sigma_W=W\Sigma W^H$. The motivation of exploring linear combinations of the received data is because certain transformations allow for more efficient searches of the more likely bit-hypotheses. The notation in Equations 6–7 is based on the linear matrix representation for samples of received waveform based on the presence of all users (see Equation 5).

Let $$W=(A^H S^H SA)^{-1} A^H S^H,\qquad\text{Equation 8}$$

Then the filter bank defined by the matrix W is the filter bank used in the decorrelator receiver. The decorrelator receiver is attractive because it optimally mitigates the multiple access interference but does not account for the colored noise. Specifically, while the multiple access interference is eliminated, assuming known correlation matrix, the white noise component has been colored (when the signature waveforms are not orthonormal). A more suitable filter bank includes the inverse of the square root of the correlation matrix. This combination results in a filter bank that partially decouples the multiple access interference yet maintains uncorrelated noise components. The cascade of the square root filter and the matched filter represents an orthonormal set of filters that are closest in a least squares sense to the signature waveforms. A square root filter bank defined using the Cholesky factorization of the correlation matrix is one of the more attractive square root factorizations. The correlation matrix is represented in Equation 8 by $$H=(A^H S^H SA)\qquad\text{Equation 9}$$

The Cholesky factorization of the correlation matrix H is defined by $$H=(A^H S^H SA)=(F^H F)\qquad\text{Equation 10}$$

Where F is an upper-triangular matrix and the whitening filter is defined as $F^{-H}$ which is a lower triangular matrix. Therefore, rather than utilize decorrelating filter bank in Equation 8, the following partial decorrelating filter bank is implemented, which is defined as:

$$W=F^{-H} A^H S^H\qquad\text{Equation 11}$$

This is more suitable for efficient searches of the weighted least squares solution. The attraction of this particular square root factorization is illustrated by $$w = F^{-H} A^H S^H r\qquad\text{Equation 12}$$
$$= Fb + z$$
$$=\begin{bmatrix} F_{11} & F_{12} & F_{13} & F_{14} & \cdots & F_{1K} \\ 0 & F_{22} & F_{23} & F_{24} & \cdots & F_{2K} \\ 0 & 0 & F_{33} & F_{34} & \cdots & F_{3K} \\ 0 & 0 & 0 & F_{44} & \cdots & F_{4K} \\ \vdots & \vdots & \vdots & \vdots & \ddots & \vdots \\ 0 & 0 & 0 & 0 & \cdots & F_{KK} \end{bmatrix}\begin{bmatrix} b_1 \\ b_2 \\ b_3 \\ b_4 \\ \vdots \\ b_K \end{bmatrix} + \begin{bmatrix} z_1 \\ z_2 \\ z_3 \\ z_4 \\ \vdots \\ z_K \end{bmatrix}.$$

(Triangular Factorizatoin Correlation Matrix)

The partial decoupling of the co-channel interference is illustrated by the mean of the whitened output, w, defined to be Fb where F is an upper triangular matrix. Let the column vector, b, be ordered by user such that the top row represents the $1^{st}$ user and the bottom row represents the $K^{th}$ user. Computing the terms in Fb shows that the $K^{th}$ user is completely decoupled from all other user's bit hypotheses. Also the $(K-1)^{th}$ users bit hypothesis is only coupled with the bit hypothesis for user K. The term partial decoupling is used because the decisions for the (K−m) users are decoupled from any of the other users such that knowledge of the first 1 to (K−m−1) users are not required for making decisions on the later (K−m) users.

Figures 5, 6:
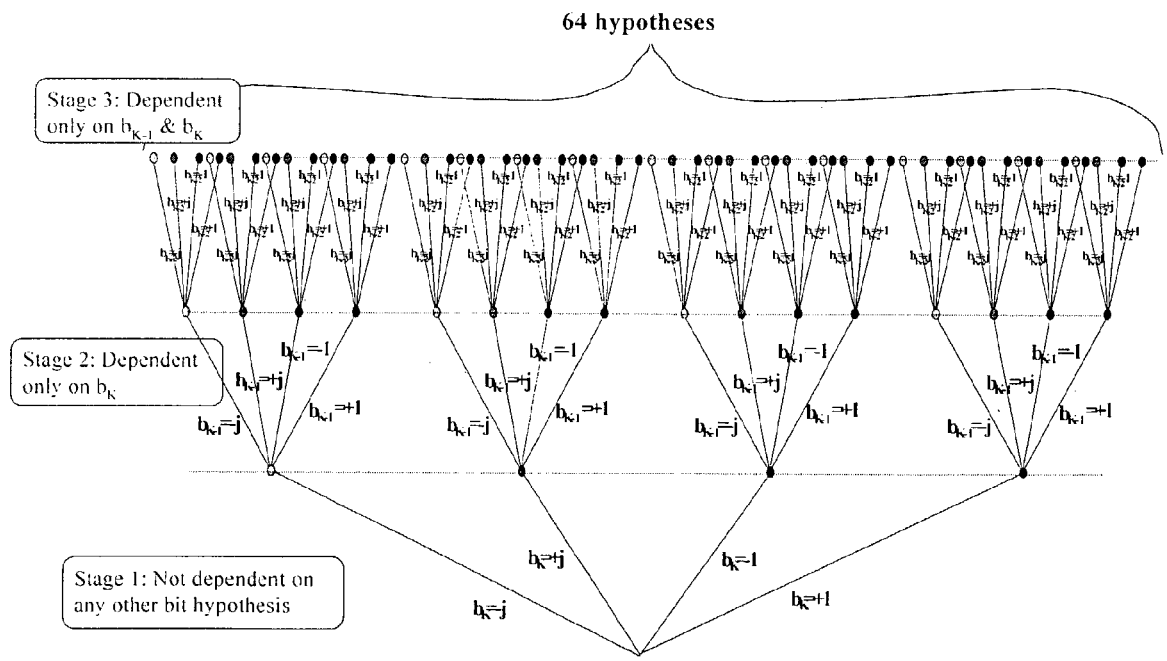
FIG. 5 shows the partial decoupling of multiple access interference due to Cholesky-based pre-whitener.
FIG. 6 Formulation of ML Statistic into Decision Trees for QPSK alphabet

Continuing in this manner illustrates how measurements for any user have been decoupled from the actual bits of any "future" user. Note, the term "future" for user k refers to all users 1 through k−1. Pictorially the result of the Cholesky based whitening is illustrated by FIG. 5. For the purposes of simplifying the description of the filtering process, the amplitude matrix has been defined to be the identity matrix in FIG. 5.

The noise is whitened by using the partial decorrelator defined by $$W=F^{-H}A^H S^H,\qquad\text{Equation 13}$$

The white noise is illustrated by $$F^{-H}(AS)^H E\{n_w n_w^H\}(AS)F^{-1}=\sigma_w^2 F^{-H}(AS)F^{-1}=\sigma_w^2 I\qquad\text{Equation 14}$$

Where I represents the identify matrix and E represents the expectation of the random variables. The diagonal covariance matrix proves that noise has been whitened using the partially decorrelating filter bank defined in Equation 13. Substituting the decorrelating filter bank in Equation 13 into Equation 7 produces the same maximum likelihood solution.

The maximum likelihood expression in Equation 7 is rewritten in terms of the metric $\Omega(b)$ which is illustrated by $$\hat{b}_{ML} = \arg \min_b \Omega(b)\qquad\text{Equation 15}$$

Where $$\Omega(b) = \sum_{k=1}^{K}\left| w_k - \sum_{j=k}^{K} F_{kj} b_j \right|^2\qquad\text{Equation 16}$$

Using Equation 16, the search for the optimal set of bits can be reformulated in terms of a decision tree in which the metric characterizing the likelihood of the bit hypothesis for user k, $b_k$, is now represented by the component $$\left| w_k - \sum_{j=k}^{K} [F_\gamma]_{kj} b_j \right|^2\qquad\text{Equation 17}$$

The term $b_k$ represents the bit hypothesis for user k and the term $w_k$ represents the filter bank output for filter k which has been matched to the signature waveform used by user k. The term $F_{jk}$ represents the Cholesky factor defined for users j and users k. The sequential nature of the ML metric is more clearly illustrated by the following expression. Each component of the summation (see Equation 17) can be considered as one of K stages of a decision tree. The following expression illustrates the first 3 terms of distance metric which would correspond to the components for the first three stages of the decision tree.

$$\Omega(b)=|w_K - F_{KK} b_K|^2 + |w_{(K-1)} - (F_{(K-1)(K-1)} b_{(K-1)} + F_{(K-1)K} b_K)|^2 + |w_{(K-2)} - (F_{(K-2)(K-2)} b_{(K-2)} + F_{(K-2)(K-1)} b_{(K-1)} + F_{(K-2)K} b_K)|^2 + \qquad\text{Equation 18}$$

Evaluating the metric over these first three stages is illustrated in FIG. 6 for the QPSK alphabet. At the first stage, Stage 1, the first component $|w_K - F_{KK} b_K|^2$ assesses the likelihood of the 4 possible states for user K. As indicated by FIG. 6, this likelihood metric is not dependent on any other decisions on other user's bits. At the second stage, an estimate of the (K−1)th users bit, $b_{(K-1)}$, is based on the $|w_{(K-1)}-(F_{(K-1)(K-1)}b_{(K-1)}+F_{(K-1)}+F_{(K-1)K}b_K)|^2$. The decision at the second stage is dependent only on the filtered data corresponding to user $b_{(K-1)}$ and the decision made for the Kth user. Similarly, the estimate of the (K−2)th user is evaluated at the third stage using the third component of the distance metric, which is dependent on the previous two decisions. This continues for all K of these components. The trend shows that early decisions on users' bits are decoupled from "future" decisions made for the remaining users' bits.

Since the entire ML metric is a summation of K of these components, there are K stages to the decision tree. The jointly optimal decision requires each one of the branches of the decision tree must be explored. The decision tree approach still requires $4^K$ hypotheses to be evaluated for the QPSK case with no multipath. By expressing the problem in terms of a decision tree we can explore pruning techniques such as the M-algorithm or T-algorithm.

For the super-saturated communications problem, there are more users than statistically independent dimensions and therefore have an under-determined problem, such that the correlation matrix is positive semidefinite (i.e. not invertible). Since the correlation matrix is not invertible the partial decorrelator in Equation 13 no longer exists because of the correlation between the channels.

A technique commonly used in regression analysis to combat multicolinearity is referred to as ridge regression. Multicolinearity results for high correlation between independent variables, which in our case corresponds to user's transmitted waveforms. Simply put $(A^H S^H SA)$ has large off-diagonal terms producing an unstable correlation matrix with high condition numbers (i.e. ratio of maximum eigenvalue to lowest eigenvalue). In regression analysis, this produces estimates with very high variance. This is resolved by accepting a small bias to minimize the variance in the estimates. This is done by transforming the correlation matrix from $(A^H S^H SA)$ to $(A^H S^H SA+\gamma I)$, where $\gamma$ represents the diagonal loading. This raises the minimum eigenvalues to produce a more stable correlation matrix at the price of biased estimates in regression analysis. For illustrative purposes the matrix representation showing the state of the art and the present invention processing is shown in Table A and B respectively. The whitener of the present invention includes the noise power value according to the formulation: $(R++\sigma^2 I)^{-1}$; wherein $\sigma$ is the noise power; I is the identity matrix.

TABLE A (prior art)

$$\begin{bmatrix} r_{11} & r_{12} & r_{13} \\ r_{12} & r_{22} & r_{23} \\ r_{13} & r_{23} & r_{33} \end{bmatrix}$$

TABLE B $$\begin{bmatrix} r_{11}+\sigma^2 & r_{12} & r_{13} \\ r_{12} & r_{22}+\sigma^2 & r_{23} \\ r_{13} & r_{23} & r_{33}+\sigma^2 \end{bmatrix}$$

The approach considered here is to alter the partial decorrelating filter bank by diagonally loading the correlation matrix thus intentionally introducing a bias with the objective of reducing the variance of the estimate which becomes more critical for the non-linear decision process inherent in the decision trees. Specifically, the new partial decorrelating filter bank is defined by $$W = F_\gamma^{-H} A^H S^H \qquad \text{Equation 19}$$

Where the Cholesky factorization of the diagonally loaded correlation matrix is such that $$F_\gamma^H F_\gamma = (A^H S^H SA + \gamma I) \qquad \text{Equation 20}$$

As previously mentioned, the concept of ridge regression consists of intentionally introducing a bias with the intention of reducing the variance of the estimates. Applying the partial decorrelating filter bank defined in Equation 19 to the received samples produces a vector K samples out of the filter bank defined by the K element column vector w. Applying the Equation 16 to the received samples is represented by $$w = F_\gamma^{-H} A^H S^H r. \qquad \text{Equation 21}$$

Substituting the matrix model representation of the received samples, defined in Equation 5 provides the resulting simplification $$w = F_\gamma^{-H} H b + F_\gamma^{-H} A^H S^H n_w \qquad \text{Equation 22}$$

where the correlation matrix H is defined in Equation 9. Based on Equation 22, it is clear the bias that was intentionally introduced through diagonal loading using the noise variance is $$\Delta w = -\gamma F_\gamma^{-H} b \qquad \text{Equation 23}$$

The Cholesky factorization of the diagonally loading correlation matrix does not completely whiten the noise as indicated by the covariance of the noise term in Equation 22 which is defined by $$\sigma_n^2 I - \gamma \sigma_n^2 (F_\gamma F_\gamma^H)^{-1} \qquad \text{Equation 24}$$

For the case of reasonable signal to noise ratios and modest diagonal loading the noise covariance after applying the diagonally loaded based partial decorrelator is approximated by $\sigma_n^2 I$. In addition, for small diagonal loadings, the bias is considered small. Based on these approximations the weighted least squares solution is approximated by $$\hat{b}_{ML} = \arg\min_b \{(w - F_\gamma b)^H (w - F_\gamma b)\} \qquad \text{Equation 25}$$

As before, the maximum likelihood solution is express by $$\hat{b}_{ML} = \arg\min_b \Omega_\gamma(b) \qquad \text{Equation 26}$$

Where $$\Omega_\gamma(b) = \sum_{k=1}^{K} \left| w_k - \sum_{j=k}^{K} [F_\gamma]_{kj} b_j \right|^2. \qquad \text{Equation 27}$$

The procedure for evaluating Equation 27 is consistent with the approach described in FIG. 6 in which the individual metrics described by $$\left| w_k - \sum_{j=k}^{K} [F_\gamma]_{kj} b_j \right|^2 \qquad \text{Equation 28}$$

are evaluated at each node of the decision tree. Referring to FIG. 6, the transition from the previous stage to the current stage of a decision tree (see FIG. 6) consists of an accrual of the individual metrics along the path of the decision tree. Various suboptimal pruning techniques, such as the M-algorithm and T-algorithm, are available for efficiently traversing the decision tree with a tolerable error rate.

It should be apparent that FIG. 3 implements the algorithm described in Equations 20, 21, 26, and 27. Equation 21 consists of applying the Cholesky Factorization of a diagonally loaded correlation matrix following the application of the matched filter bank. Therefore, the matched filter bank described in Equation 21 is applied in 120. To complete the partial decorrelating filter bank, an overloaded asynchronous whitener application 135 is applied to the filtered data from the matched filter 120. The asynchronous whitener in 135 consists of applying the Cholesky factorization of the diagonally loaded correlation matrix described in Equation 20.

The purpose of the parameter estimation module, 110, is to estimate timing, signal amplitudes, phases, polarizations, and identification of active channels. Estimates of the parameters are used to model the channel which is required for application of the matched filter 120 and development of the asynchronous decorrelating filter bank. The parameter estimation module provides the channel model and the correlation matrix.

The purpose of the overloaded asynchronous whitener designer 130 is to design the whitener 135. The overloaded asynchronous whitener designer 130 utilizes the correlation matrix shown in Equation 14, provided by the parameter estimation module to compute the diagonally loaded Cholesky Factorization described in Equation 20. Based on the parameters estimator 110 values, designer 130 develops a model of received signal and computes a whitener that essentially consists of a square-root factorization of the diagonally loaded correlation matrix. The factorization is used for whitening 135 and used in hypothesis testing 140. Since this approach is an extension of DDFD, the concept of ordering the users by "decreasing received energies" is maintained such that the strongest users are evaluated first. This ordering defines the type of square-root matrix and is maintained in the hypothesis testing module, 140. Extensions to include simple ordering techniques, such as SNR based, likelihood based, etc. are obvious. The Cholesky factorization is one approach that computes the square-root matrix with a triangular form. This triangular structure is well suited for the decision-tree hypothesis pruning module 140 because it allows for sequential decoding. The approach used in the whitener designer 130 includes an asynchronous factorization that exploits the block-banded structure of the correlation matrix. The symbol synchronous problem is a degenerate case and therefore as part of the invention. Extensions that include windowing based techniques that are known to those in the art and included herein.

The whitener designer 130 also includes extensions for reducing wordlengths and improving processing speed. For example, a QR factorization using Householder transformations implemented on a matrix that consists of signature waveform matrix augmented with diagonal matrix requires smaller wordlengths than the Cholesky factorization of the diagonally loaded correlation matrix. Algorithm implementations that use small wordlengths are more suitable for fixed-point processing hardware configurations. In addition, this invention includes the use of Hyperbolic Householder transformations in whitener designer 130 to efficiently update the whitener when only the received energies and/or phases change between symbol periods. For example, this extension can used on IS-95 signal sets when the channels repeat after 512 symbols periods The square-root factorization of the correlation matrix produced in whitener designer 130 is used to whiten the data 135. This present invention includes two approaches to whitening the matched filtered data. The first approach is based on applying a bank of filters defined by the inverse of the conjugate transpose of the square-root matrix. Since the square-root has been defined with a triangular structure, a whitening procedure using back-substitution is implemented. This alternative approach requires less number of operations.

The whitened data stream exits the whitener 135 and is passed to the symbol hypothesis testing module 140. The square-root factorization defined in the whitener designer 130 is passed to symbol hypothesis testing 140. This factorization is used in the metrics to sequentially evaluate the bit hypotheses in the decision tree that can be implemented using breadth-first techniques such as the M-algorithm or T-algorithm. As described herein, the user ordering used to define the correlation matrix factorization and whitening filter is maintained in this hypothesis testing module 140.

The purpose of symbol-hypothesis testing 140 is to efficiently investigate the more likely bit hypotheses for all K users. The symbol hypothesis testing 140 is based on sequential evaluation of metric characterizing likelihood of hypotheses described in FIG. 5. This evaluation is based on the metrics described in Equations 26 and 27. Unlike the decision feedback approaches, decisions are not immediately made. However, the approach considered here is a generalization of the decision feedback techniques and therefore include the decision feedback techniques.

The metric corresponding to a particular user's bit hypothesis at a stage in the decision tree is detailed herein as follows for a preferred embodiment. The metric consists of the Euclidean distance between the output of the one of the whitening filters and the hypothesized mean signal energy based on the bit hypothesis for the user in question and the mean signal energy corresponding to the hypotheses selected for users previously tested. This mean signal energy is based on the Cholesky factorization of the diagonally loaded correlation matrix that was computed in the whitener designer 130. The metric at each node of the decision tree illustrated in FIG. 6 includes the accumulation of metrics corresponding to previous decisions. As stated herein, using the decision feedback approaches, decisions are not immediately made. This sequential concept was observed in FIG. 6 and Equation 17 by expanding out the terms of the Euclidean distance between all the filter banks samples and the hypothesized mean signal based on arbitrary bit hypotheses. The output of the symbol-hypothesis testing 135 are constrained estimates of the symbols for all users in the symbol period of interest.

Various efficient decision tree search strategies can be employed in symbol-hypothesis testing 140. For example, the M-algorithm is one such approach that restricts the number of hypotheses at each stage to a fixed number. The T-algorithm is similar in nature to the M-algorithm, however, it restricts the number of hypotheses by comparing the accrued metric to a threshold. Extensions of this approach to other efficient approaches to decision tree searches are obvious.

The overloaded asynchronous whitener application 135 partially decorrelates the multiaccess interference and simultaneously whitens the additive noise. This is accomplished by developing a pseudo-whitening filter 120 based on a diagonally loaded correlation matrix. The diagonal loading technique is common in regression analysis to combat multicolinearity, which is due to high correlation between independent variables. The present approach intentionally introduces a small bias, but reduces the variance of the unconstrained estimates prior to the decision process that occurs in the decision tree. In the supersaturated signaling scheme, the noise is nearly whitened and for the undersaturated case, the noise is completely whitened. When the diagonal load equals the noise power, this solution is an extension of the MMSE Decision Feedback Detector. Unlike the MMSE-DFD, the decisions are deferred until more evidence has been accumulated. Note, if the problem is undersaturated, less users than dimensions, then the diagonal loading can be tuned such that the implementation simplifies to the IDDFD. Unlike IDDFD, the approach documented here performs well in super-saturated signaling environments and has been shown to nearly achieve maximum capacity in these environments.

Figure 7:
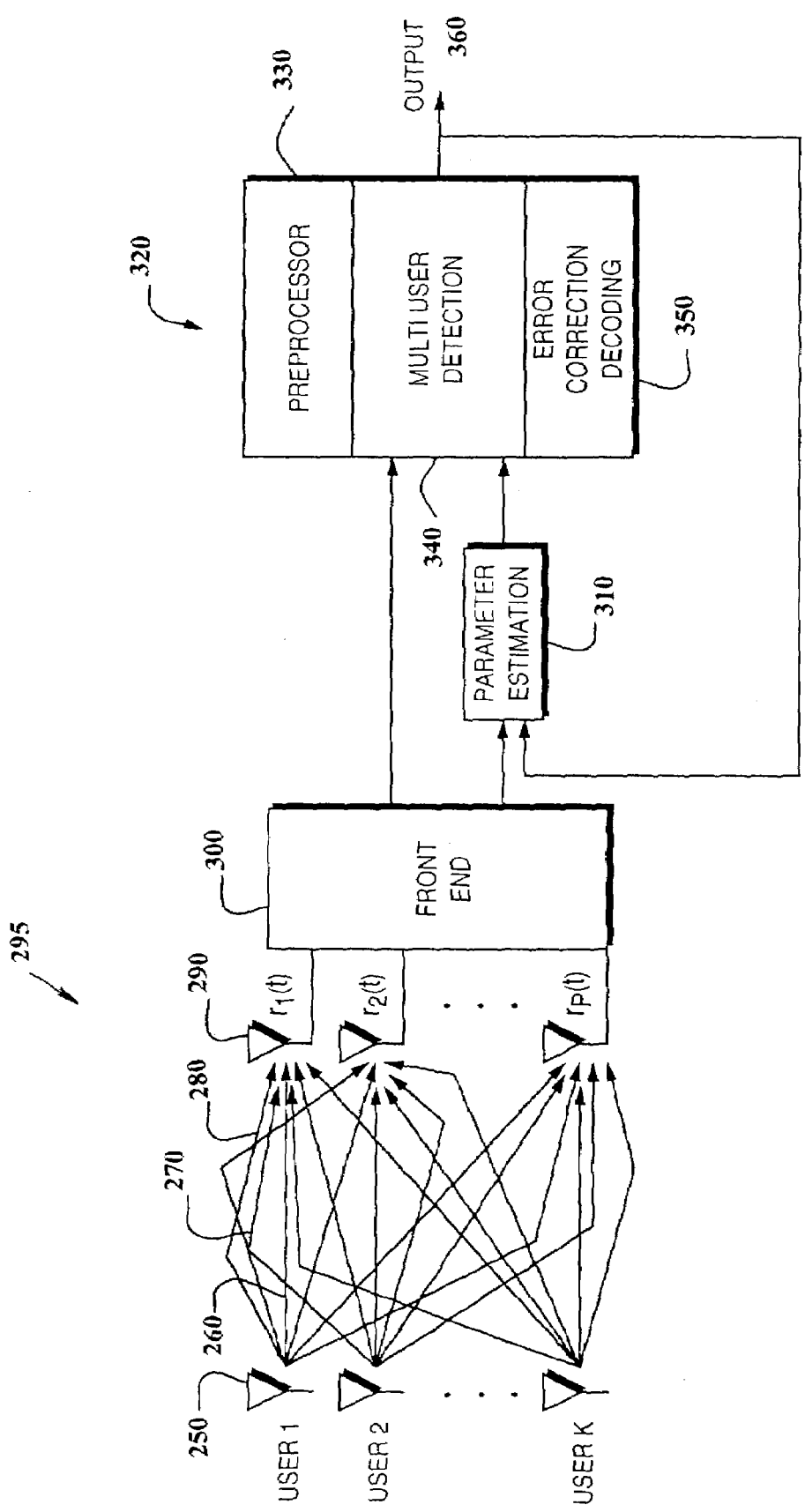
FIG. 7 shows an application of the present invention in a wireless communications system showing transmitted signals, reception, basic processing blocks to resolving the user signals

A typical communication wireless application for the present invention is shown in FIG. 7, wherein a number of users (1–K) generate signals that are sent by transmitters 250 into free space. There is normally a noise component 295 that is introduced from the environment of a random nature in the received signal. While any noise that has a repeatable or non-random nature can be eliminated through processing, random noise elements are reduced in other manners. The various signals are received at antennas (1–p) 290, wherein there is one signal for each polarization feed. The signals represent directly received signals 260, as well as multi-path signals 270 from the same user, and interfering signals 280 from other users.

The plurality of signals from each antenna 290 are processed in a front end unit 300. The RF front end unit 300 downconverts the higher frequency signals into baseband signals for ease of processing. The baseband signals are also digitized by analog to digital converters (A/D). The front end cooperates with the parameter estimation unit 310 to retrieve needed information for the signals such as relative received timing offsets, carrier phase, frequency offsets, received amplitudes, and multipath structure for each of the interefering signals present in the received signal. The overloaded front-end unit 330 couples to the parameter estimator and the MUD 340.

The MUD topology 320 consists of functional blocks that process the digital data and extract the user signals. The overloaded front end is essentially a pre-processor 330 that converts the baseband digital data into the proper format for further processing according to the desired detection scheme. The format is typically one measurement per 'dimension' per symbol. As noted herein, the configuration of the overloaded front-end of the present invention puts the data in much more reasonable fashion prior to processing. The multi-user detection stage 340 is detailed herein and cooperates with the error correction decoding (ECD) 350 for iterations of the TurboMUD processing.

The output of the iterative MUD element 320 is returned for a number of iterations in conjunction with the parameter estimation unit 310 that uses the returns the data to the MUD 320 for subsequent processing. When the output K bit stream 360 has reached a certain level of processing as described herein, the output signals 360 are forward to the output stage (not shown). Alternatively the number of iterations can be used to fix the amount of processing.

It is readily apparent that the hybrid TurboMUD technique is used in a variety of applications and with varied methods for implementing the system, and is therefore not limited to the embodiments presented herein. Various variations and modifications may be made without departing from the scope of the present invention. The overloaded front-end 330 can be incorporated within numerous other MUD and TurboMUD implementations disclosed in the art and in the related pending applications.

For example, the commonly owned patent applications describing varied forms of multi-user systems are hereby incorporated by reference for all purposes: application Ser. No. 10/208,409 entitled Power and Confidence Ordered Low Complexity Soft TurboMUD with Voting System filed Jul. 29, 2002; (D4606) application Ser. No. 10/120,955 entitled Method and Apparatus for Improved Turbo Multiuser Detector filed Apr. 11, 2002; and application Ser. No. 10/055,155 entitled Voting System for Improving the Performance of Single-User Decoders within an Iterative Multi-User Detection System filed Jan. 23, 2002.

One application which shows a non-CDMA environment is to the application involving GSM, which is a narrow band TDMA system. The user communicates over a timeslot and when the time slot is filled, another user has to wait until an open slot is available. The present invention allows reassignment of the timeslot so that signals from a second user can overlay a first user. The only distinguishing characteristics would be some phase and power differences that can be employed as described herein to differentiate user 1 from user 2.

Another application of the invention is to allow for multi-user detection for a variety of communications formats and not solely limited to CDMA. The processing scheme of the present invention manipulates bits utilizing some apriori information so that the system has some knowledge of what the signals were supposed to have been had they been received individually and without interference or other impairments. For example, as communications in airplanes continue to become more prevalent, there will be multiple users trying to communicate within a given bandwidth. The present scheme allows these multiple users to function within the same region by picking apart attributes that distinguish one user from another.

While the operation of the subject system has been described in terms of a wireless communications network, it has application to any situation in which digitally encoded interfering signals exist. Thus, the subject system has application to cable networks in which multiple users are seeking to communicate with a head end system simultaneously. In another embodiment, the present system is incorporated into reading storage mediums, such as computer hard drives, and to separate signals from adjacent tracks when the read head overlies portions of adjacent tracks. With the increasing density of storage devices such as hard drives, memory cards, and various storing discs, there are significant commercial advantages and incentives to place more data on smaller spaces and being able to quickly and reliably extract the data. The processing schema of the present invention is easily tailored to such an application as the data from the compact tracks of the recorded medium from the storage devices resembles wireless data bits and requires processing to promptly access and retrieve the desired data. The MUD processing with respect to the storage devices refer to the plurality of signals received when the optical head picks up the signals of the adjacent tracks of the storage mediums. The tight spacing between the tracks creates a multiple user detection problem involving the processing of the desired track signal from the other received tracks. An as example illustrating a disc drive embodiment, commonly owned patent application Ser. No. 10/251,187 entitled Multichannel Digital Recording System with Multi-User Detector is hereby incorporated by reference for all purposes.

A further application of the present invention is in a cable modem environment. The Cable Modem Termination System provides the head end interconnect for a plurality of individual cable modems for the transmission of data. In rough terms, the cable modem functions like a local area network (LAN). The cable modem itself combines an upstream modulator and a downstream demodulator. Most current networks are hybrid-fiber-coax networks using fiber for the main lines and coax cable connecting to the individual houses and cable modems. Inside the home, the cable modem can be connected to any of the various devices such as TV for cable television programs. It also provides Internet connectivity, interactive TV interface, smart appliance operation, and email access among other functions. The Cable Modem Termination System (CMTS) connects to the main grid that connects to a number of cable modems. The cable modems connect to a variety of devices, such as personal computer and televisions. The present invention allows the use of the data processing from the CMTS to each of a plurality of houses in a fashion similar to the base station deployment.

Numerous characteristics and advantages have been set forth in the foregoing description, together with details of structures and functions, and the novel features thereof are pointed out in appended claims. The disclosure, however, is illustrative only, and changes may be made in arrangement and details, within the principle of the invention, to the full extent indicated by the broad general meaning of the terms in which the appended claims are expressed.

What is claimed is:

1. A whitened front end for a tree-pruned multiuser detection (MUD) system, comprising:
   a parameter estimator coupled to a data stream providing estimation values of said data stream, wherein said data stream is an aggregate of a plurality of signals, and each signal is assigned a channel, and wherein said plurality of signals exceeds a number of signal space dimensions of said MUD, resulting in an overloaded condition;
   a filter bank having a plurality of filters coupled to said data stream and coupled to said parameter estimator, wherein each of said signals is individually coupled to said plurality of filters and produces a filtered output, and wherein said filters exceeds said number of signal space dimensions;
   a whitener designer coupled to said parameter estimator, wherein said whitener designer computes a whitener factorization for said signals, wherein the signals exceeds said number of signal space dimensions;
   an overloaded whitener unit coupled to said filter bank and said whitener designer, wherein said whitener unit applies said whitener factorization to said filtered output to produce a partially de-correlated and whitened output; and, a symbol-hypothesis testing section coupled to said whitener designer and said whitened output, wherein said symbol-hypothesis testing section uses a hypothesis pruning to perform a decision tree search.

2. The whitened front end according to claim 1, wherein said MUD system employs an algorithm, and wherein said algorithm is selected from the group comprising: M-algorithm, T-algorithm, and Fano-algorithm.

3. The whitened front end according to claim 1, wherein said whitener factorization is based on ordering selected from at least one of the group consisting of: received power, signal-to-noise ratio, and likelihood based.

4. The whitened front end according to claim 1, wherein said estimation values are selected from at least one of the group consisting of: timing estimates, channel estimates, amplitude estimates, phase estimates, and polarization angle estimates.

5. The whitened front end according to claim 1, wherein said filter is selected from at least one of the group consisting of: a whitening matched filter, a whitened-M algorithm filter, and a matched filter.

6. The whitened front end according to claim 1, wherein said whitener factorization is selected from at least one of the group consisting of: QR factorization, Cholesky factorization, and Hyberbolic Householder transformations.

7. The whitened front end according to claim 1, wherein said hypothesis pruning makes decisions sequentially and each decision is fedback to subtract a corresponding interference from said data stream and an individual metrics along a path of said decision tree is accrued.

8. A multiuser detection (MUD) apparatus for over-loaded conditions, wherein a plurality of signals having multi-access interference and noise are received as a data stream, comprising:
   a parameter estimator providing estimation values of said data stream, wherein each signal is assigned a channel, and wherein said plurality of signals exceeds a number of signal space dimensions of said MUD;
   an overloaded front-end coupled to said parameter estimator, said overloaded front end processing said plurality of signals wherein said signals exceeds said number of dimensions, and wherein said overloaded front end performs a hypothesis pruning procedure and produces a whitened output;
   a multiuser detector coupled to said whitened output, wherein said multiuser detector produces a set of soft decisions for each of said plurality of signals, and wherein said multiuser detector operates in said overloaded conditions; and
   a bank of decoders coupled to said multiuser detector, wherein said bank of decoders calculates a set of conditional probabilities for each of said plurality of signals, and produces an output data stream for each of said plurality of signals.

9. The multiuser detection (MUD) apparatus according to claim 8, wherein said output data stream is hard values.

10. The multiuser detection (MUD) apparatus according to claim 8, wherein said output data stream is soft values.

11. The multiuser detection (MUD) apparatus according to claim 10, wherein said apparatus is a TurboMUD and said soft values are fed back to said multiuser detector for a number of iterations.

12. The multiuser detection (MUD) apparatus according to claim 11, wherein said number of iterations is fixed.

13. The multiuser detection (MUD) apparatus according to claim 11, wherein said number of iterations is based upon a desired quality.

14. The multiuser detection (MUD) apparatus according to claim 8, further comprising an interleaver coupled between an output of said bank of decoders and an input to said multiuser detection unit and a deinterleaver coupled to an output of said multiuser detection unit and an input of said bank of decoders.

15. A method for estimating symbols in a supersaturated communications system, comprising the steps of:
receiving a plurality of signals, wherein said plurality of signals exceeds a number of signal space dimension of said system, resulting in an overloaded condition;
estimating timing, signal amplitudes, phases, polarizations, and identification of active channels for each of said signals in said overloaded condition;
filtering each of said signals producing a plurality of filtered signals in said overloaded condition;
partially decorrelating multi-access interference and partially whitening noise from said plurality of filtered signals in said overloaded condition; and
performing a hypothesis pruning procedure on said signals to produce a bit stream, wherein said hypothesis pruning defers decisions.

16. The method for estimating symbols according to claim 15, further comprising a step of performing multiuser detection (MUD) on said bit stream.

17. The method for estimating symbols according to claim 16, wherein said MUD uses an algorithm selected from at least one of the group consisting of: an M-algorithm, T-algorithm, and a FANO-algorithm.

18. The method for estimating symbols according to claim 15, wherein said step of performing said hypothesis pruning procedure comprises the steps of ordering each of said signals and forming a decision tree.

19. The method for estimating symbols according to claim 18, wherein said ordering is selected from at least one of the group consisting of: received power, signal-to-noise ratio, and likelihood based.

20. The method for estimating symbols according to claim 15, wherein said filtering is selected from at least one of the group of filters consisting of: a whitening matched filter, a whitened-M algorithm filter, and a matched filter.

\* \* \* \* \*